US012310903B2

(12) United States Patent
Heimbrock et al.

(10) Patent No.: US 12,310,903 B2
(45) Date of Patent: May 27, 2025

(54) PREVIEW FUNCTION FOR CONTINUOUS LATERAL ROTATION THERAPY

(71) Applicant: Hill-Rom Services, Inc., Batesville, IN (US)

(72) Inventors: Richard H. Heimbrock, Cincinnati, OH (US); Robert M. Zerhusen, Cincinnati, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 1051 days.

(21) Appl. No.: 17/318,419

(22) Filed: May 12, 2021

(65) Prior Publication Data

US 2021/0378894 A1 Dec. 9, 2021

Related U.S. Application Data

(60) Provisional application No. 63/036,706, filed on Jun. 9, 2020.

(51) Int. Cl.

*A61G 7/018* (2006.01)
*A61G 7/008* (2006.01)
*A61G 7/057* (2006.01)

(52) U.S. Cl.

CPC ............. *A61G 7/018* (2013.01); *A61G 7/008* (2013.01); *A61G 7/05769* (2013.01); *A61G 2203/20* (2013.01)

(58) Field of Classification Search

CPC ........ A61G 7/001; A61G 7/005; A61G 7/008; A61G 7/015; A61G 7/018; A61G 7/0524; A61G 7/05769; A61G 2203/20; A61G 2203/42; G06F 3/0481; G06F 3/0488

USPC ...................................................... 5/607, 609

See application file for complete search history.

(56) References Cited

U.S. PATENT DOCUMENTS 7,712,171 B2 * 5/2010 Butler ................ A61G 7/05715 5/81.1 R
8,413,271 B2 4/2013 Blanchard et al.
8,413,274 B2 4/2013 Weismiller et al.
8,466,801 B2 6/2013 Hayes et al.
9,013,313 B2 4/2015 Paine
9,358,168 B2 6/2016 Williamson et al.
9,849,051 B2 12/2017 Newkirk et al.
10,363,181 B2 7/2019 Williamson et al.
10,617,581 B2 * 4/2020 Gibson .............. A61G 7/05769
2006/0101581 A1 * 5/2006 Blanchard ................ A61G 7/00 5/713

(Continued)

FOREIGN PATENT DOCUMENTS

WO WO-2013192411 A2 * 12/2013 ........... A47C 27/082
WO 2018195221 A1 10/2018

*Primary Examiner* — David R Hare

(74) *Attorney, Agent, or Firm* — Barnes & Thornburg LIP

(57) ABSTRACT

A patient support apparatus may include a patient support surface including a rotation device. A controller may be operable to control the rotation device. The controller may include a processor and a non-transitory memory device. The memory device may include instructions that, when executed by the processor, cause the processor to operate the rotation device to perform a rotation preview sequence. During the rotation preview sequence, the controller may cause the rotation device to move the patient support surface to a first evaluation position for a first predetermined period of time.

19 Claims, 16 Drawing Sheets

(56) References Cited

U.S. PATENT DOCUMENTS

| | | | | |
|---|---|---|---|---|
| 2006/0117482 | A1 * | 6/2006 | Branson | A61G 7/05769 5/600 |
| 2008/0235872 | A1 * | 10/2008 | Newkirk | G06F 3/0481 5/658 |
| 2009/0094744 | A1 * | 4/2009 | Benzo | A61G 7/015 5/608 |
| 2012/0198627 | A1 * | 8/2012 | Turner | A61G 7/015 5/613 |
| 2013/0317393 | A1 | 11/2013 | Weiss et al. | |
| 2013/0340168 | A1 | 12/2013 | Meyer et al. | |
| 2014/0007353 | A1 * | 1/2014 | Stryker | A61G 7/05723 5/715 |
| 2014/0323816 | A1 | 10/2014 | Soderberg et al. | |
| 2018/0369038 | A1 | 12/2018 | Bhimavarapu et al. | |
| 2018/0369039 | A1 | 12/2018 | Bhimavarapu et al. | |

* cited by examiner

PREVIEW FUNCTION FOR CONTINUOUS LATERAL ROTATION THERAPY

CROSS-REFERENCE TO RELATED APPLICATIONS

This application claims priority under 35 U.S.C. § 119(e) to U.S. Provisional Application No. 63/036,706, filed Jun. 9, 2020, which is expressly incorporated by reference herein.

TECHNICAL FIELD

The present disclosure relates to a system and method for controlling patient support surfaces. More particularly, the present disclosure relates to a system and method for previewing control parameters for rotational therapy on a patient support surface.

BACKGROUND

Currently, caregivers face significant challenges taking care of patients on patient support surfaces with therapy needs. Often patient therapy includes lateral rotation of the patient support surface for patients needing pulmonary therapy or decubitus prevention or treatment. The patient support surface typically includes a mattress that is laterally rotated by an air support system having a plurality of air bladders including include a right rotation bladder and a left rotation bladder. A pneumatic control system includes an air handling unit that is mounted to a base of the bed and a control device mounted, for example, to an end rail or side rail of the bed. The rotation bladders are inflated and deflated to rotate the patient support surface to a left or right angle.

Generally, the patient on the support surface is coupled to several lines, for example, an IV or an air tube of a respirator device. As the air bladders of the patient support surface are actuated to rotate the patient, the patient's lines may become pinched or caught in various moveable components of the bed or by appendages of the patient themselves. For example, the line may be caught under the leg or arm of the patient. In another example, the line may be caught between the patient and the side rail. Such events may result in the fluids in the lines becoming occluded or the lines becoming entirely disconnected.

SUMMARY

The present application discloses one or more of the features recited in the appended claims and/or the following features which, alone or in any combination, may comprise patentable subject matter.

According to a first aspect of the disclosed embodiments, a patient support apparatus may include a patient support surface including a rotation device. A controller may be operable to control the rotation device. The controller may include a processor and a non-transitory memory device. The memory device may include instructions that, when executed by the processor, cause the processor to operate the rotation device to perform a rotation preview sequence. During the rotation preview sequence, the controller may cause the rotation device to move the patient support surface to a first evaluation position for a first predetermined period of time. The first predetermined period of time may enable the caregiver to assess a patient on the patient support surface at the first evaluation position. The rotation device may move the patient support surface to a flat position after the first predetermined period of time. During the first predetermined period of time, the caregiver may be enabled to cancel the rotation preview sequence so that the controller returns the patient support surface to the flat position before the expiration of the first predetermined period of time. After the rotation preview sequence, the caregiver may be enabled to activate a rotation sequence to move the patient support surface to a desired angle of rotation over a rotation period of time that is greater than the first predetermined period of time.

In some embodiments of the first aspect, the rotation device may include a left rotation bladder and a right rotation bladder. The first evaluation position may include at least one of a left rotation position, wherein the left rotation bladder is inflated to a capacity greater than the right rotation bladder, and a right rotation position, wherein the right rotation bladder is inflated to a capacity greater than the left rotation bladder. In the flat position, the right rotation bladder and the left rotation bladder may be inflated to substantially the same capacity. The first evaluation position may have an angle of rotation relative to a longitudinal axis of the patient support surface that is within a range of 1 degree to 40 degrees. The first predetermined period of time may be within a range of 0 seconds to 30 seconds.

It may be desired, in the first aspect, that, during the rotation preview sequence, the rotation device may move the patient support surface to a second evaluation position for a second predetermined period of time. The second predetermined period of time may begin at an expiration of the first predetermined period of time. The second predetermined period of time may enable the caregiver to assess the patient on the patient support surface at the second evaluation position. The second evaluation position may have an angle of rotation that is substantially zero. The second predetermined period of time may be within a range of 0 seconds and 30 seconds.

It may be contemplated, in the first aspect, that, during the rotation preview sequence, the rotation device may move the patient support surface to a third evaluation position for a third predetermined period of time. The third predetermined period of time may begin at an expiration of the second predetermined period of time. The third predetermined period of time may enable the caregiver to assess a position of a patient on the patient support surface at the third evaluation position. The rotation device may move the patient support surface to the flat position after the third predetermined period of time. During the third predetermined period of time, the caregiver may be enabled to cancel the rotation preview sequence so that the controller returns the patient support surface to the flat position before an expiration of the third predetermined period of time. The third evaluation position may have an angle of rotation relative to a longitudinal axis of the patient support surface that is within a range of 1 degree to 40 degrees. The third predetermined period of time may be within a range of 0 seconds and 30 seconds.

Optionally, in the first aspect, a display may include buttons for the caregiver to enter initial rotation parameters prior to the start of the rotation preview sequence. The initial rotation parameters may include the desired angle of rotation. During a training preview the control system may cause intermittent movement of the rotation device to the desired angle of rotation over a plurality of periods of time.

According to a second aspect of the disclosed embodiments, a patient support apparatus may include a patient support surface including a rotation device. A controller may be operable to control the rotation device. The controller may include a processor and a non-transitory memory device. The memory device may include instructions that, when executed by the processor, cause the processor to operate the rotation device to perform a rotation preview sequence. During the rotation preview sequence, the controller may cause the rotation device to move the patient support surface to a plurality of evaluation positions for at least one predetermined period of time. The at least one predetermined period of time may enable the caregiver to assess a position of a patient on the patient support surface at the plurality of evaluation positions. The rotation device may move the patient support surface to a flat position after the predetermined periods of time. During the predetermined periods of time, the caregiver may be enabled to cancel the rotation preview sequence so that the controller returns the patient support surface to the flat position before the expiration of the predetermined periods of time. After the rotation preview sequence, the caregiver may be enabled to activate a rotation sequence to move the patient support surface to a desired angle of rotation over a rotation period of time that is greater than the predetermined periods of time.

In some embodiments of the second aspect, the rotation device may include a left rotation bladder and a right rotation bladder. The plurality of evaluation positions may include a left rotation position, wherein the left rotation bladder is inflated to a capacity greater than the right rotation bladder, and a right rotation position, wherein the right rotation bladder is inflated to a capacity greater than the left rotation bladder. In the flat position, the right rotation bladder and the left rotation bladder may be inflated to substantially the same capacity. At least one of the plurality of evaluation positions has an angle of rotation relative to a longitudinal axis of the patient support surface that is within a range of 1 degree to 40 degrees. At least one of the plurality of evaluation positions has an angle of rotation relative to a longitudinal axis of the patient support surface that is substantially zero. At least one of the predetermined periods of time may be within a range of 0 seconds to 30 seconds.

Optionally, in the second aspect, a display may include buttons for the caregiver to enter initial rotation parameters prior to the start of the rotation preview sequence. The initial rotation parameters may include the desired angle of rotation. During a training preview the control system may cause intermittent movement of the rotation device to the desired angle of rotation over a plurality of periods of time.

According to a third aspect of the disclosed embodiments, a method of previewing lateral rotation in a patient support apparatus may include actuating a rotation preview sequence. During the rotation preview sequence, a rotation device of a patient support surface may be actuated to move the patient support surface to a first evaluation position for a first predetermined period of time. The first predetermined period of time may enable the caregiver to assess a patient on the patient support surface at the first evaluation position. The method may also include actuating the rotation device to move the patient support surface to a flat position after the first predetermined period of time. The method may also include prompting a caregiver to cancel the rotation preview sequence, during the first predetermined period of time, so that the patient support surface returns to the flat position before the expiration of the first predetermined period of time. The method may also include prompting the caregiver to activate a rotation sequence, after the rotation preview sequence, to move the patient support surface to a desired angle of rotation over a rotation period of time that is greater than the first predetermined period of time.

In some embodiments of the third aspect, the rotation device may include a left rotation bladder and a right rotation bladder. The first evaluation position may include at least one of a left rotation position, wherein the method includes inflating the left rotation bladder to a capacity greater than the right rotation bladder, and a right rotation position, wherein the method includes inflating the right rotation bladder to a capacity greater than the left rotation bladder. In the flat position, the method may include inflating the right rotation bladder and the left rotation bladder to substantially the same capacity. The method may also include actuating the rotation device to an angle of rotation relative to a longitudinal axis of the patient support surface that is within a range of 1 degree to 40 degrees in the first evaluation position. The method may also include actuating the rotation device for a first predetermined period of time that is with a range of 0 seconds to 30 seconds.

Optionally, in the third aspect, the method may also include actuating the rotation device to move the patient support surface to a second evaluation position for a second predetermined period of time. The second predetermined period of time may begin at an expiration of the first predetermined period of time. The second predetermined period of time may enable the caregiver to assess a position of a patient on the patient support surface at the second evaluation position. The method may also include actuating the rotation device to move the patient support surface to the flat position having after the second predetermined period of time. During the second predetermined period of time, the method may also include prompting the caregiver to cancel the rotation preview sequence so that the rotation device returns the patient support surface to the flat position before the expiration of the second predetermined period of time. The method may also include actuating the rotation device to an angle of rotation relative to the longitudinal axis of the patient support surface that is substantially zero degrees in the second evaluation position. The method may also include actuating the rotation device for a second predetermined period of time that is within a range of 0 seconds and 30 seconds.

It may be desired, in the third aspect, that the method also includes actuating the rotation device to move the patient support apparatus to a third evaluation position for a third predetermined period of time. The third predetermined period of time may begin at an expiration of the second predetermined period of time. The third predetermined period of time may enable the caregiver to assess a position of a patient on the patient support surface in the third evaluation position. The method may also include actuating the rotation device to move the patient support surface to the flat position having after the third predetermined period of time. The method may also include prompting the caregiver to cancel the rotation preview sequence, during the third predetermined period of time, so that the controller returns the patient support surface to the flat position before the expiration of the third predetermined period of time. The method may also include actuating the rotation device to a third angle of rotation relative to a longitudinal axis of the patient support surface that is within a range of 0 degrees to 40 degrees in the third evaluation position. The method may also include actuating the rotation device for a third predetermined period of time that is within a range of 0 seconds and 30 seconds.

It may be contemplated, in the third aspect, that the method also includes prompting the caregiver to enter initial rotation parameters prior to the start of the rotation preview sequence. The initial rotation parameters may include the desired angle of rotation.

According to a fourth aspect of the disclosed embodiments, a patient support apparatus may include a patient support surface including a rotation device. A graphical user interface may include a display. A control system may be operable to control the rotation device and the display. The control system may include a non-transitory memory device. The memory device may include instructions that, when executed enable the display to display at least one preview input, which, when selected, enables the control system to cause the rotation device to move the patient support surface to a desired angle of rotation for a preview period of time. The preview period of time may enable the caregiver to assess a patient on the patient support surface at the selected angle. The instructions, when executed, may also enable the display to display a start input which, when selected, enables the control system to cause the rotation device to move the patient support surface to the desired angle of rotation for a full therapy period of time that is greater than the preview period of time.

In some embodiments of the fourth aspect, the instructions, when executed, may enable the display to display a cancel input which, when selected, enabled the control system to cancel movement of the rotation device to return the patient support surface to a flat position. The desired angle of rotation may be within a range of 1 degree to 40 degrees. The preview period of time may be within a range of 0 seconds to 30 seconds.

Optionally, in the fourth aspect, the instructions, when executed, may enable the display to display a training input which, when selected, enabled the control system to cause the intermittent movement of the rotation device to the desired angle of rotation over a plurality of periods of time. The rotation device may be moved to 50% of the desire angle of rotation over a first of the plurality of periods of time. The rotation device may be moved to an additional 10% of the desired angle of rotation over a second of the plurality of periods of time. The second of the plurality of periods of time may occur one hour after the first of the plurality of periods of time.

According to a fifth aspect of the disclosed embodiments, a patient support apparatus may include a patient support surface including a moving section. A controller may be operable to control the moving section. The controller may include a processor and a non-transitory memory device. The memory device may include instructions that, when executed by the processor, cause the processor to operate the moving section to perform a movement preview sequence. During the movement preview sequence, the controller may cause the moving section to move the patient support surface to a plurality of evaluation positions for at least one predetermined period of time. The at least one predetermined period of time enables the caregiver to assess a position of a patient on the patient support surface at the plurality of evaluation positions. The moving section may move the patient support surface to a flat position after the predetermined periods of time. After the movement preview sequence, the caregiver may be enabled to activate a movement sequence to move the patient support surface to a desired position over a movement period of time that is greater than the predetermined periods of time.

In some embodiments of the fifth aspect, during the at least one predetermined period of time, the caregiver may be enabled to cancel the movement preview sequence so that the controller returns the patient support surface to the flat position before an expiration of the first predetermined period of time. The least one predetermined period of time may be within a range of 0 seconds to 30 seconds. A display may include buttons for the caregiver to enter initial movement parameters prior to the start of the movement preview sequence. The initial movement parameters may include the desired position.

Optionally, in the fifth aspect, the moving section may include a left rotation bladder and a right rotation bladder. The plurality of evaluation positions may include a left rotation position, wherein the left rotation bladder is inflated to a capacity greater than the right rotation bladder, and a right rotation position, wherein the right rotation bladder is inflated to a capacity greater than the left rotation bladder. In the flat position, the right rotation bladder and the left rotation bladder may be inflated to substantially the same capacity.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
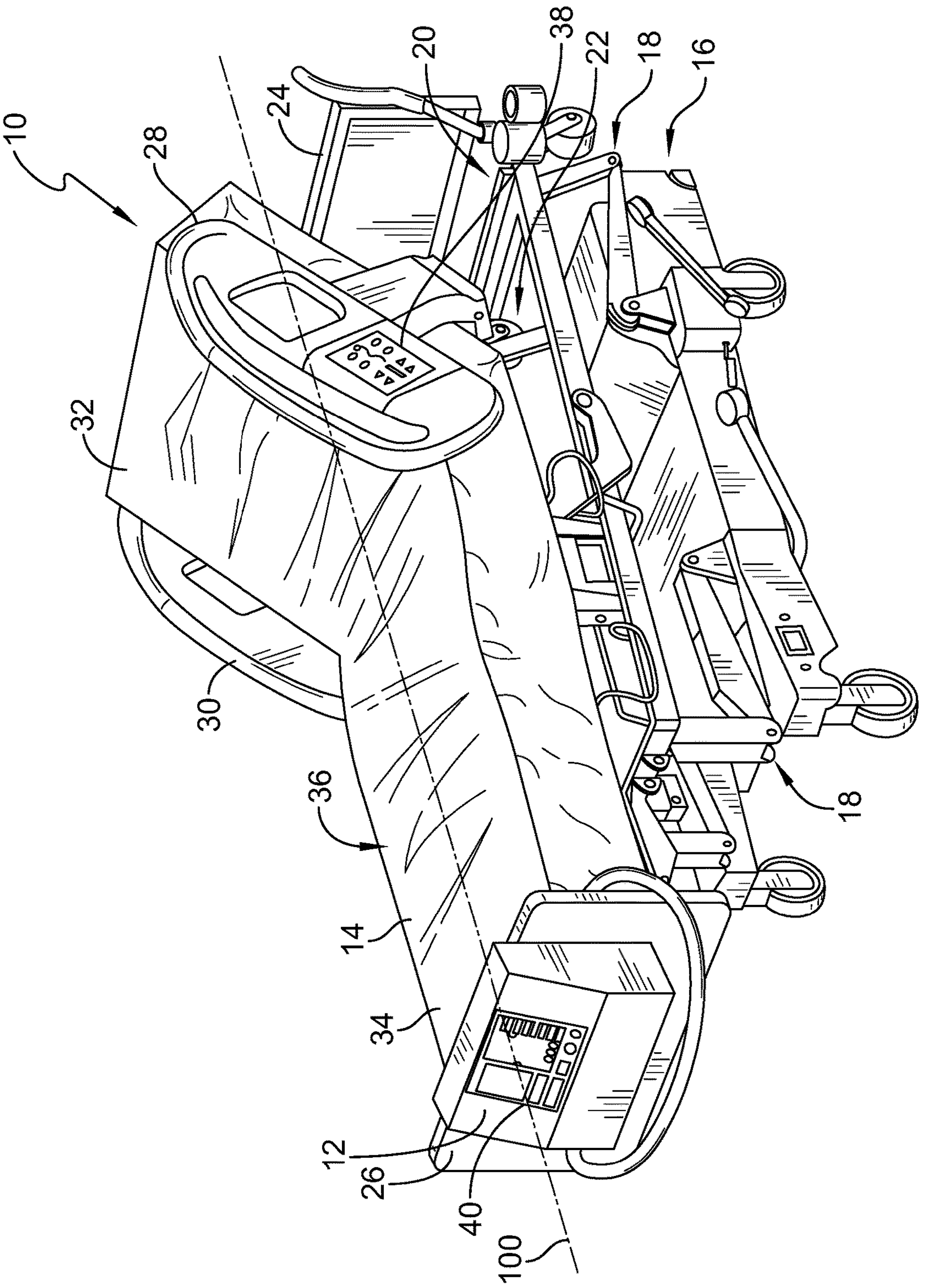
FIG. 1 is a perspective view of a hospital bed system including the touch screen control system for lateral rotation of the bed support surface according to the present disclosure.

FIG. 1 illustrates a patient support apparatus, illustrated as a bed 10, having a patient support surface, illustrated as a mattress 14. A touch screen control system 12 including a user interface 40 is provided for controlling lateral rotation of the mattress 14. The bed 10 includes a base frame 16, an intermediate frame 20 coupled to the base frame 16 by linkages 18, and an articulating deck frame 22 that is coupled to the intermediate frame 20 and that supports the mattress 14. The bed 10 also includes a head end 24, a foot end 26, a left side rail 28, and a right side rail 30. A longitudinal axis 80 extends from the head section 24 to the foot end 26. The deck frame 22 includes separate sections that articulate relative to the base frame 16 and relative to each other, for example, a mattress center section 36 that is height adjustable, and a mattress head section 32 and a mattress foot section 34 that are adjustable in elevation relative to the mattress center section 36. A patient control panel 38 is used to control articulation of the deck frame 22.

Figure 2:
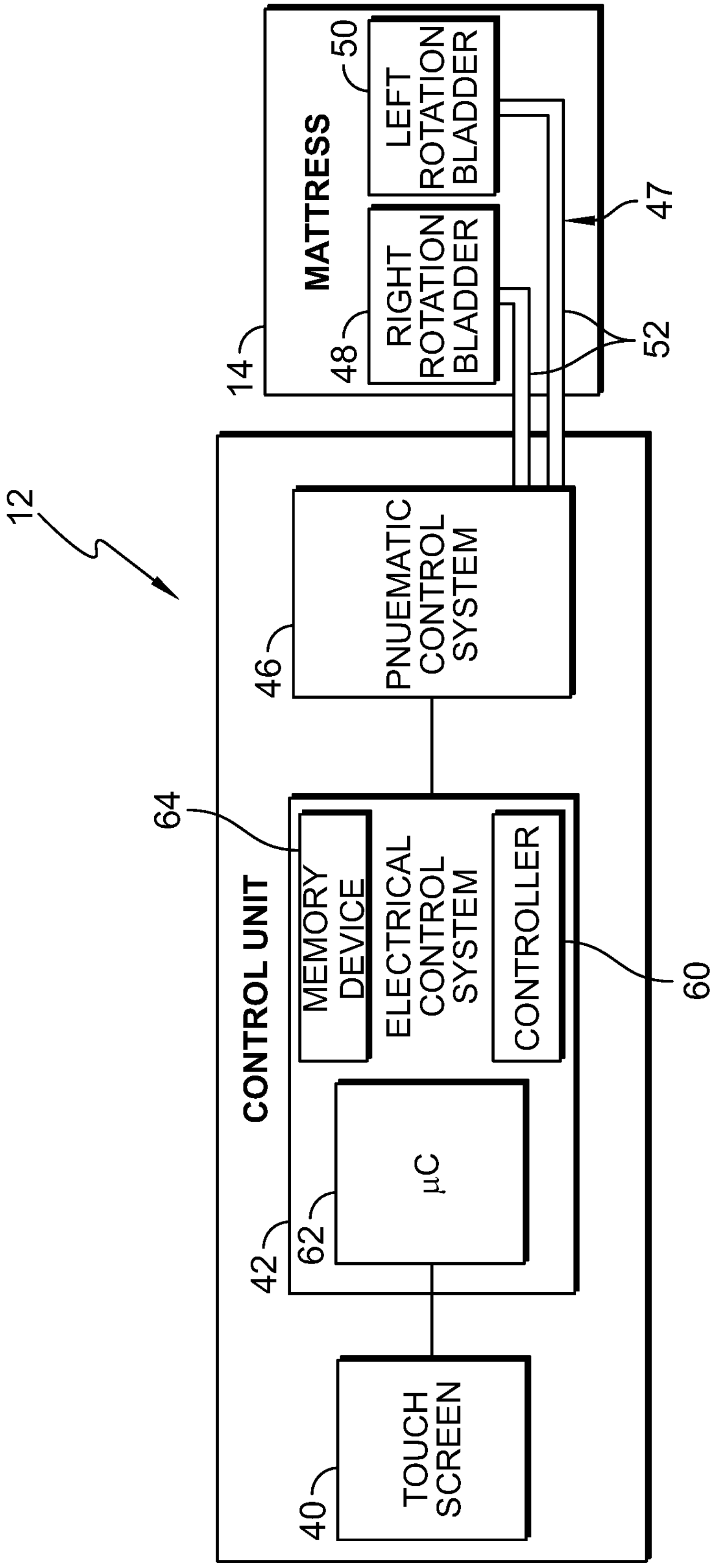
FIG. 2 is a block schematic diagram of the touch screen control system.

FIG. 2 illustrates the control system 12 and its interaction with the mattress 14. The control system 12 includes the user interface 40, an electrical control system 42, and a pneumatic control system 46. The electrical control system 42 includes a controller 60, a microprocessor 62, and a memory device 64. The electrical control system 42 is electrically coupled to the user interface 40 and the pneumatic control system 46. The memory device 64 includes instructions that, when carried out by the microprocessor 62 cause the controller 60 to control the control system 42 and the pneumatic control system 46.

The mattress 14 includes a rotation device, for example, a bladder system 47 having a right rotation bladder 48 and a left rotation bladder 50 that provides positioning and/or therapy, for example, rotational therapy, percussion therapy, vibration therapy, and positioning to assist turning of the patient. The control system 12 controls the right rotation bladder 48 and a left rotation bladder 50 by receiving user inputs at the user interface 40. The electrical control system 42 controls and monitors the pneumatic control system 46 based on the user inputs. The user interface 40 provides a graphical interface for setting and monitoring the electrical control system 42 and the pneumatic control system 46, which in turn actuate pneumatic aspects of the right rotation bladder 48 and a left rotation bladder 50. The pneumatic control system 46 is coupled to the right rotation bladder 48 and the left rotation bladder 50 by pneumatic lines 52. Additionally, pressure sensors (not shown) or alternative type sensors such as capacitive, inductive, or optical sensors, may also provide feedback control of the bladders 48 and 50 to the pneumatic control system 46 or the electrical control system 42.

Figure 4:
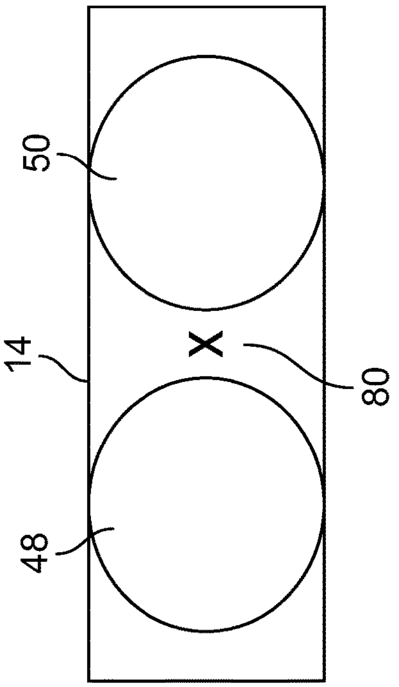
FIG. 4 is an end view of the support surface shown in FIG. 1 illustrating the support surface in a flat position.
Figure 3:
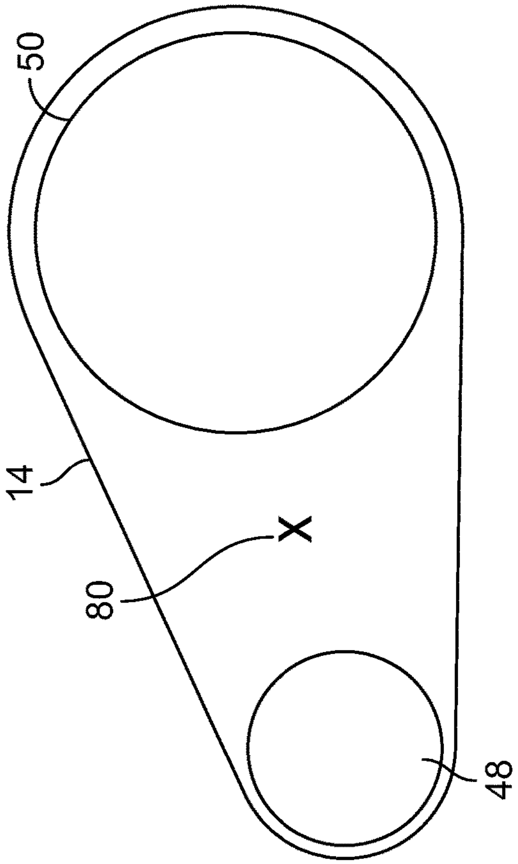
FIG. 3 is an end view of the support surface shown in FIG. 1 illustrating the rotation of the support surface with the left side lifted.
Figure 5:
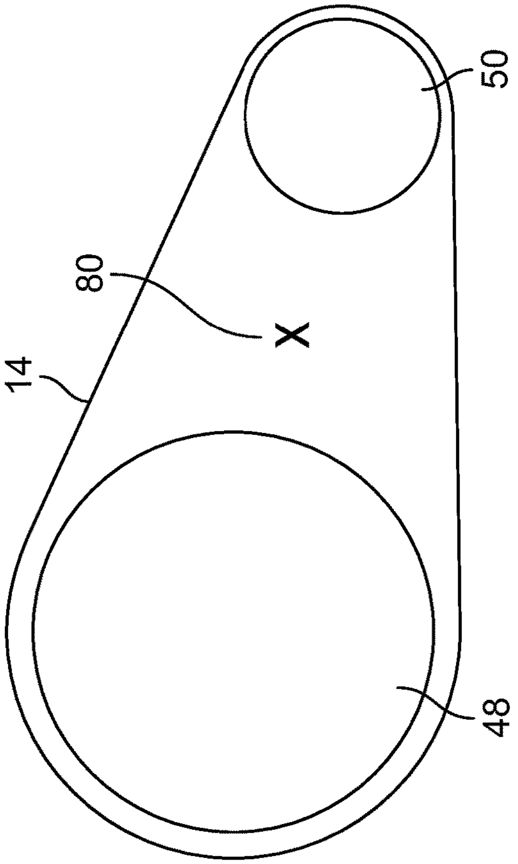
FIG. 5 is an end view of the support surface shown in FIG. 1 illustrating the rotation of the support surface with the right side lifted.

The pneumatic control system 46 generally provides pressure or vacuum to, or sealing of the pneumatic lines 52 in order to selectively inflate, deflate, or maintain the inflation of the bladders 48 and 50. For example, to rotate a patient on the mattress 14 toward the right relative to a longitudinal axis 80 of the mattress 14, the pneumatic control system 46 actuates the right rotation bladder 48 located under the patient's right side to a volume or capacity that is less than a volume or capacity of the left rotation bladder 50 located under the patient's left side, as illustrated in FIG. 3. In another example, to rotate a patient on the mattress 14 toward the left relative to the longitudinal axis 80, the pneumatic control system 46 actuates the left rotation bladder 50 located under the patient's left side to a volume or capacity that is less than a volume or capacity of the right rotation bladder 48 located under the patient's right side, as illustrated in FIG. 5. To position the patient in a flat orientation, as shown in FIG. 4, the left rotation bladder 50 and the right rotation bladder 48 are actuated to substantially the same volume or capacity.

Alternatively, only one of or a portion of the bladders of the bladder system 47 may be actuated by inflation or deflation to laterally rotate a patient on mattress 14 to different rotational positions. Additionally, the bladder system 47 may comprise bladders that are associated with the mattress 14 in an arrangement different from that shown in FIGS. 2-5, as is known in the art. For example, the bladder system 47 may include vertically stacked bladders, one of which is normally inflated and another that is inflated or deflated to provide rotation. Additionally, the pneumatic control system 46 may also provide other pneumatic control, for example, to provide percussion, vibration, or other desired patient therapy or positioning. The pneumatic control system 46 and the bladder system 47 of mattress 14 may alternatively include a non-pneumatic mechanical or electrometrical control and motion system, or a pneumatic system utilizing movement elements other than bladders.

When a patient (not shown) is positioned on the mattress 14, the patient may be coupled to various pieces of equipment (not shown). For example, the patient may be coupled to an intravenous line (IV) or tubes from a respirator device. It will be appreciated that a patient in a healthcare setting may have numerous lines, tubes, and cords connected to the patient. During articulation of the bed 10 or the mattress 14, these lines may become pinched, caught, or otherwise occluded or disconnected. Accordingly, the embodiments described herein provide a preview of patient positioning when rotational therapy is to be enabled. That is, the embodiments described herein rotate the patient to various evaluation positions for a predetermined period of time so that a caregiver can assess whether any patient lines are occluded or disconnected.

During rotational therapy, the patient is rotated to desired angles of rotation on each of the right side, left side, and flat for a rotation period of time. For example, the patient may be rotated to 40 degrees to each side for 10 minutes and flat for 10 minutes. Generally, the bladders 48, 50 are actuated over a period of dwell or hold time that enables the patient to slowly be moved into the desired angle of rotation. It will be appreciated that any rotational angle may be desired for any period of time. The preview function of the disclosed embodiments, enables a caregiver to quickly assess whether any lines will be occluded by rotating the patient to the desired angles of rotation without dwell or hold time. That is, the caregiver may assess the patient at a plurality of evaluation positions for predetermined periods of time including a right turn position, a left turn position, and a flat position without waiting for dwell or hold time.

In an exemplary embodiment, the patient is turned to a right turn position for a right turn predetermined period of time. The right turn predetermined period of time may be any suitable period of time for evaluation, for example, 0 seconds to 30 seconds. During the right turn predetermined period of time, the caregiver assess the patient and the patient lines. If any patient lines are occluded, the caregiver may stop the preview and return the patient to the flat position before expiration of the right turn predetermined period of time. After an expiration of the right turn predetermined period of time, the patient is rotated to the flat position for a flat predetermined period of time. The flat predetermined period of time may be any suitable period of time for evaluation, for example, 0 seconds to 30 seconds. If any patient lines are occluded, the caregiver may stop the preview before expiration of the flat predetermined period of time. After an expiration of the flat predetermined period of time, the patient is rotated to a left turn position for a left turn predetermined period of time. The left turn predetermined period of time may be any suitable period of time for evaluation, for example, 0 seconds to 30 seconds. If any patient lines are occluded, the caregiver may stop the preview and return the patient to the flat position before expiration of the left turn predetermined period of time.

The evaluation positions may have an angle of rotation that is the same as the desired angle of rotation. In some embodiments, the angle of rotation of the evaluation positions may be less than or greater that the desired angle of rotation. For example, the angle of rotation for evaluation may be within a range of 0 degrees to 40 degrees. After the expiration of the last predetermined period of time, the patient support apparatus returns to a flat position. At this time, the caregiver may make any necessary adjustments to the patient lines and either perform a second preview or initiate the rotational therapy.

Figure 6:
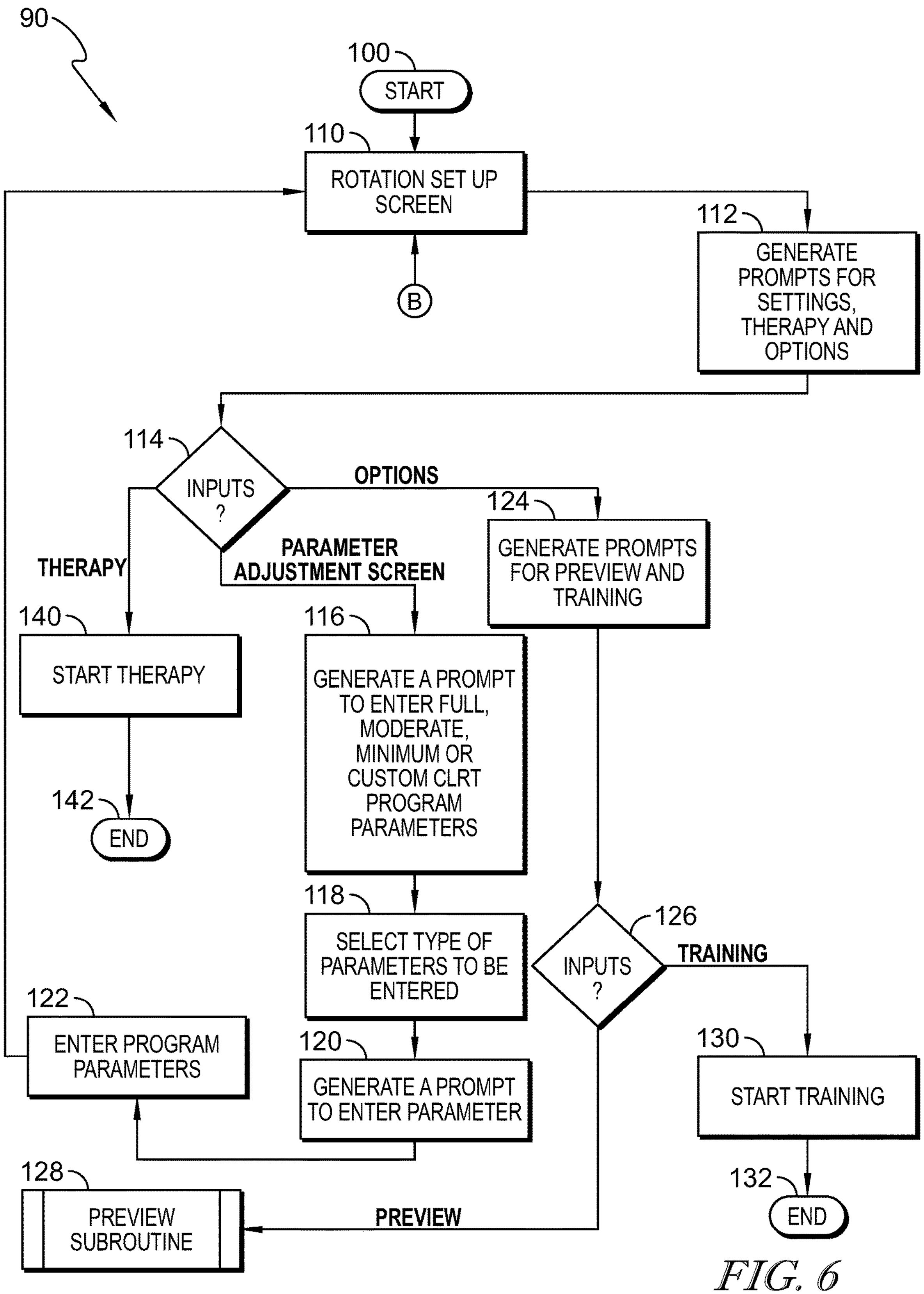
FIG. 6 is a flow chart illustrating an algorithm that executes a preview routine.
Figure 7:
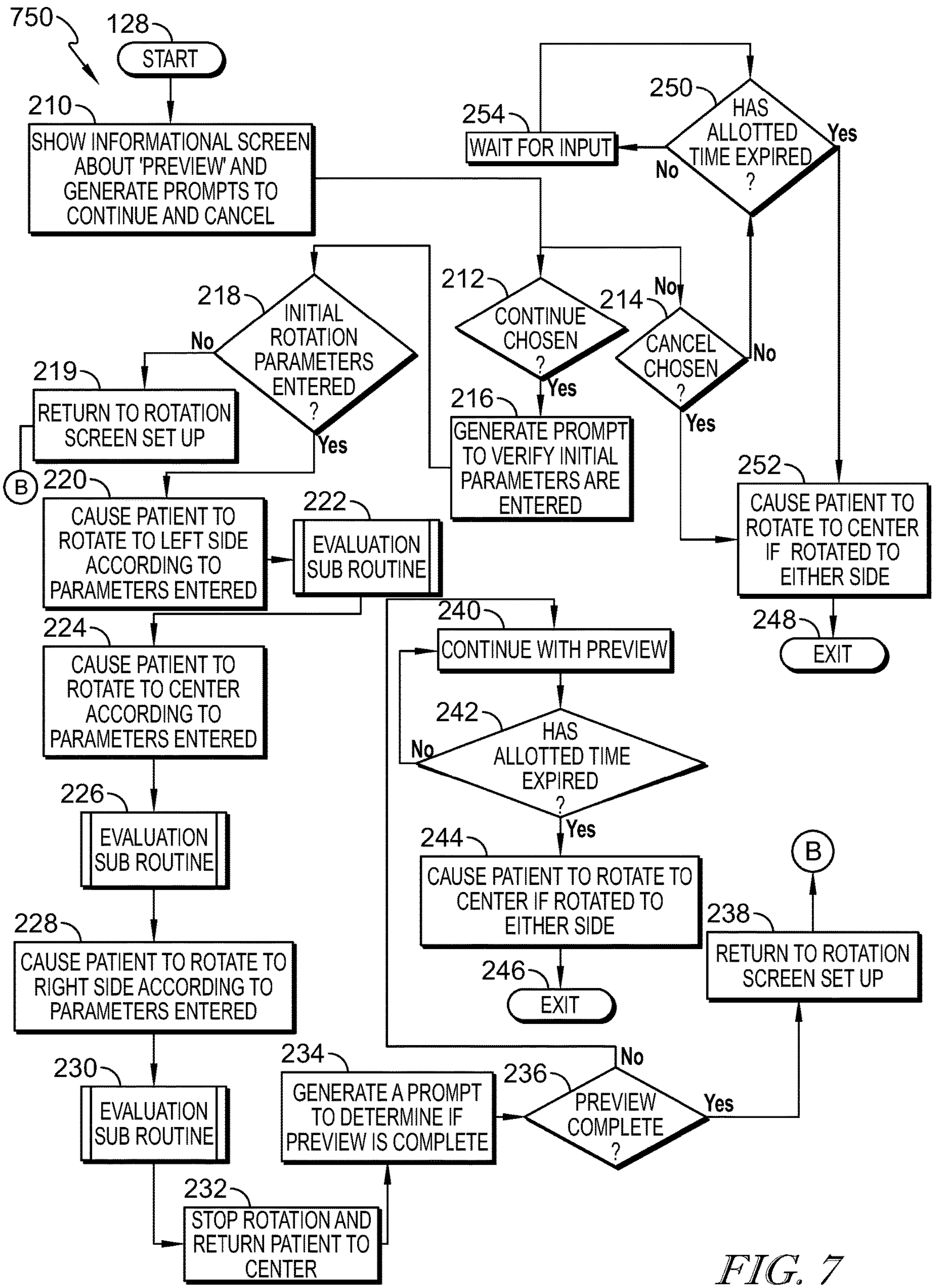
FIG. 7 is a flow chart illustrating an algorithm that executes a preview subroutine of the preview routine.
Figure 8:
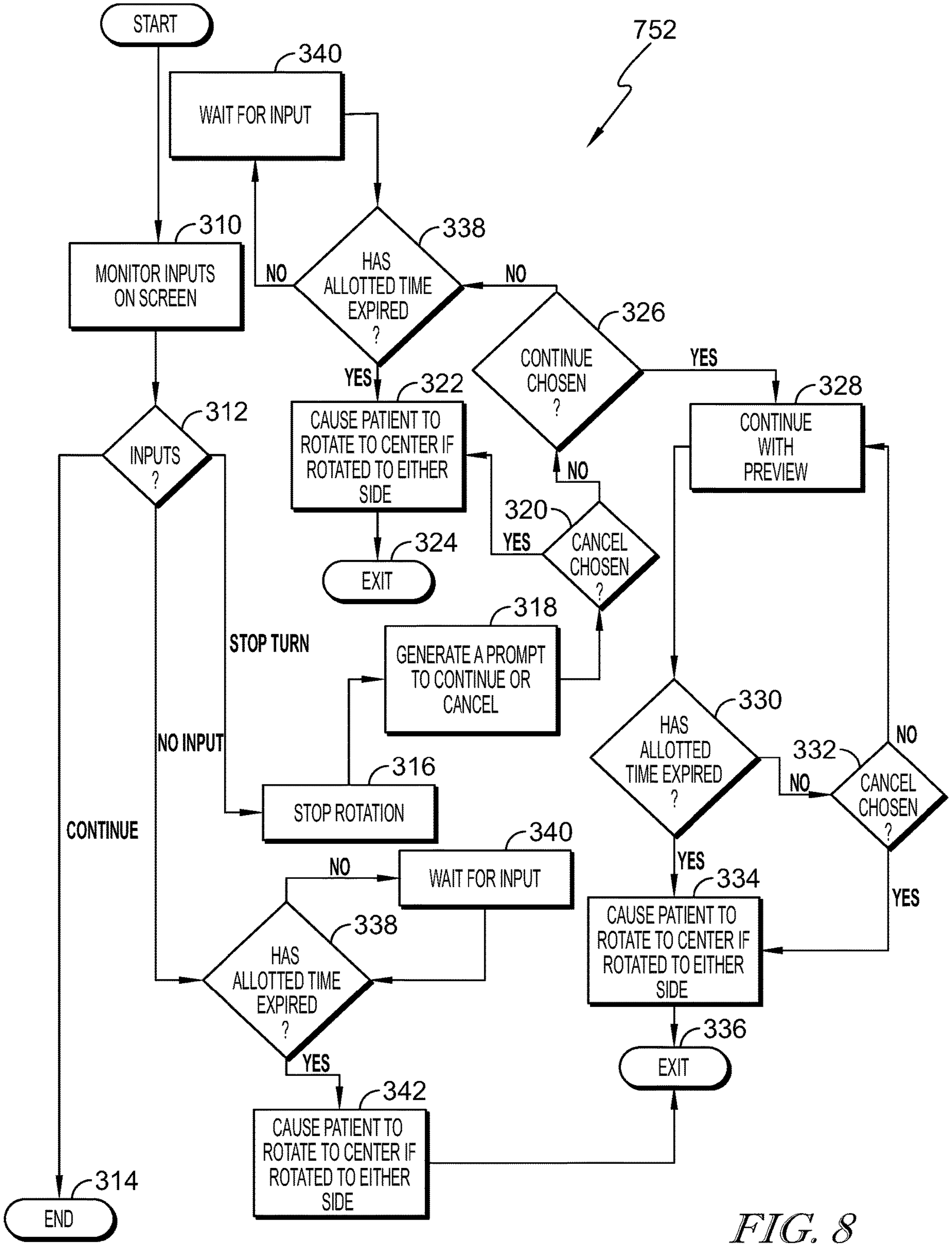
FIG. 8 is a flow chart illustrating an algorithm that executes an evaluation subroutine.

FIGS. 6-8 illustrate routines for different aspects of an algorithm executed the microprocessor 62 associated with the controller 60 based on sets of instructions in the memory device 64. These algorithms enable the caregiver to preview and assess the patient position at various angles of rotation, as set forth above.

Figure 9:
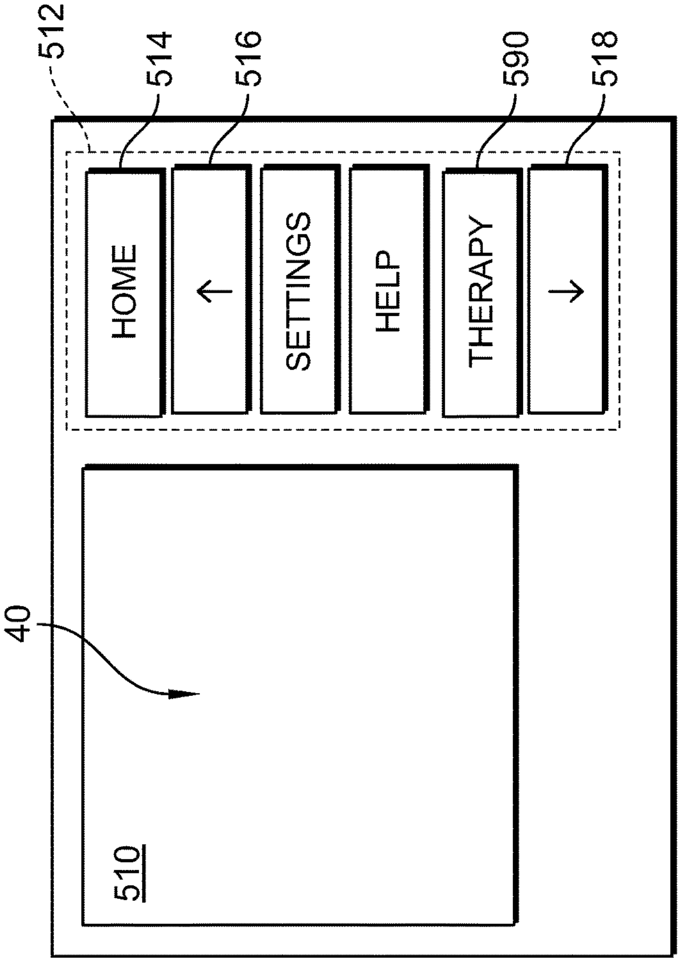
FIG. 9 is a view of a user interface for controlling lateral rotation of the support surface of the patient support apparatus.
Figure 10:
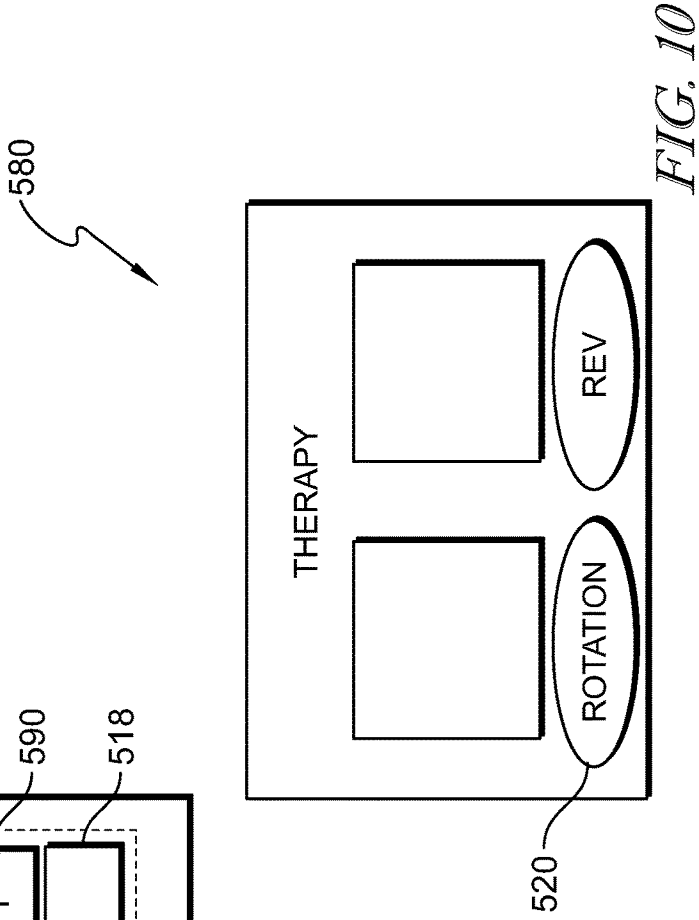
FIG. 10 is a view of a "Therapy" screen displayed on the user interface.
Figure 11:
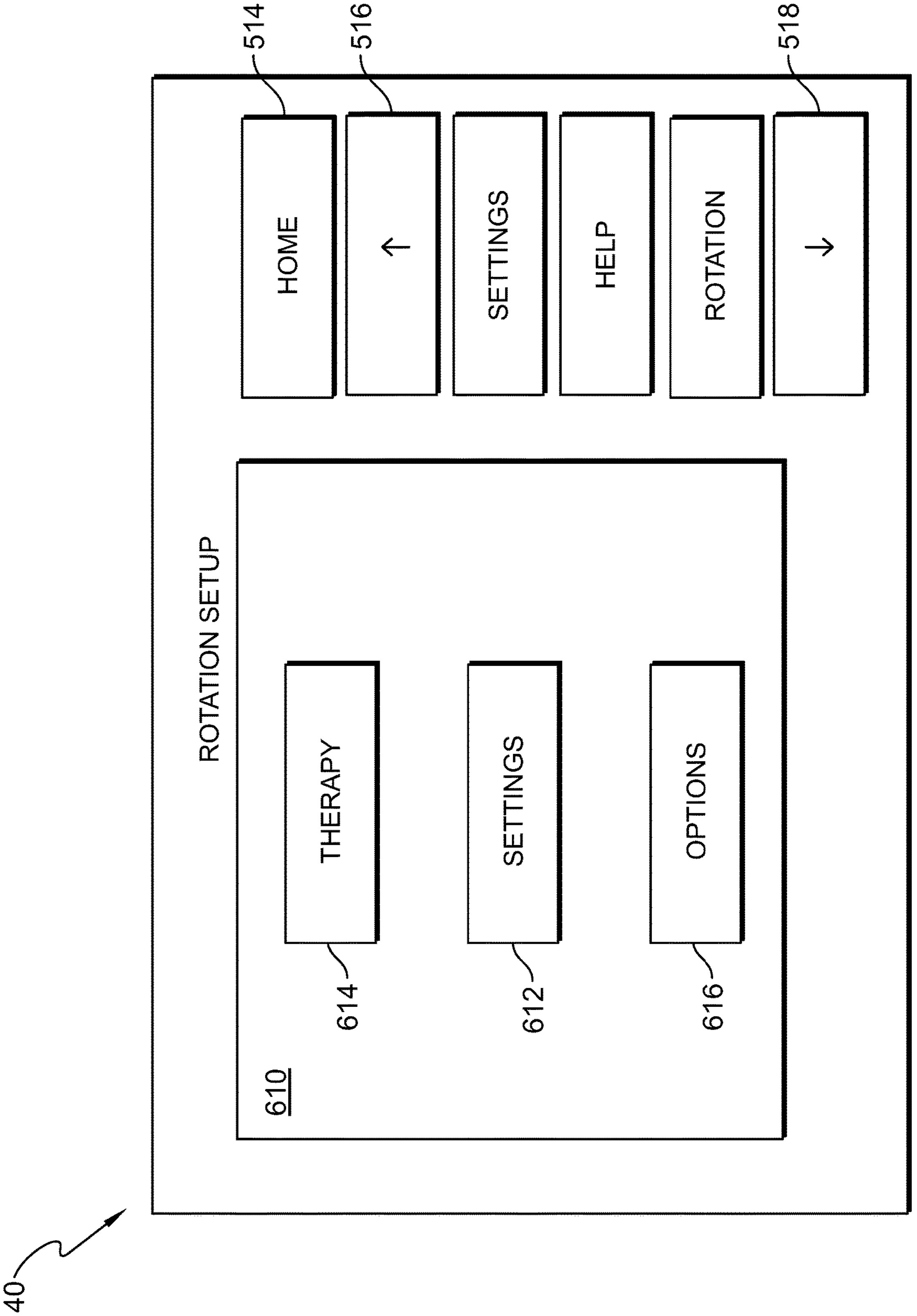
FIG. 11 is a view of a "Rotation Set-up" screen displayed on the user interface.

The user interface 40, illustrated FIG. 9, includes a display screen 510 and input buttons 512, including a "Home" button 514 and up and down arrow buttons 516, 518. The caregiver may select a "Therapy" screen 580, as shown in FIG. 10, by selecting a "Therapy" button 590 of the user interface. A "Rotation Set-up" screen 610, shown in FIG. 11, may be selected by pressing the "Rotation" button 520 of the "Therapy" screen 580 shown in FIG. 10. The "Rotation" button 520 is used to enter and preview parameters associated with lateral rotation for patients needing pulmonary therapy. For example the "Rotation" button 520 may be utilized to enter the desired angle of rotation for therapy, and/or the rotational time period. Selection of the "Rotation" button 520 results in the "Rotation Set-up" screen 610 appearing on the user interface 40, as illustrated in FIG. 11.

Figure 12:
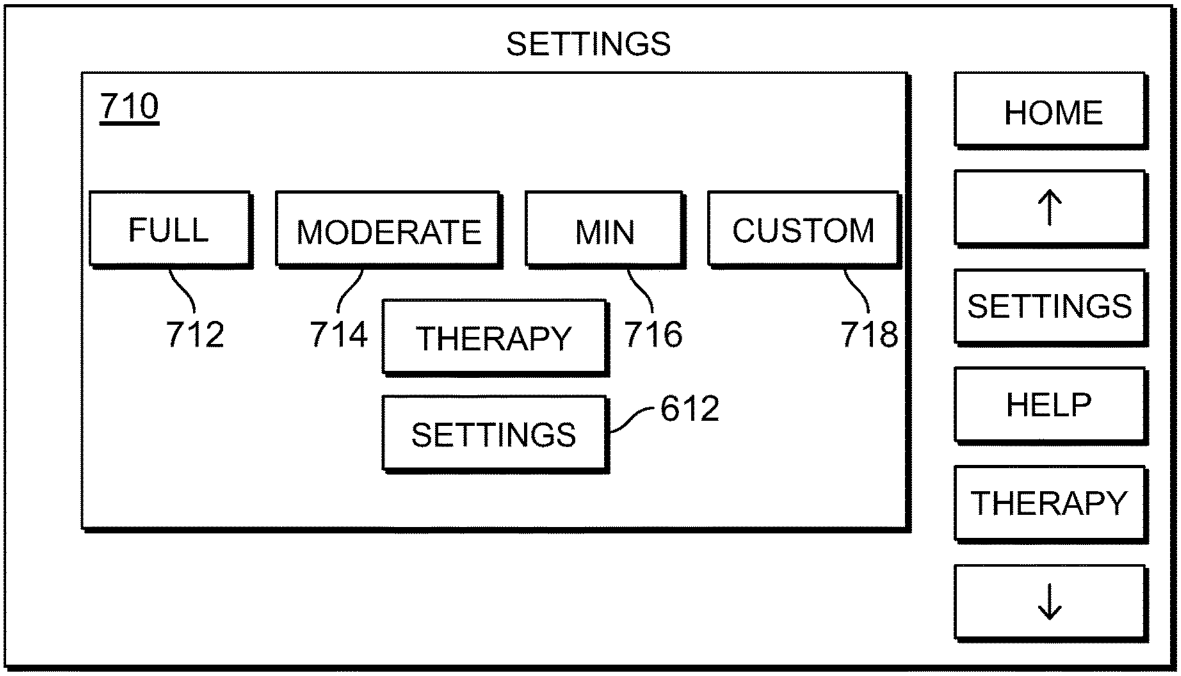
FIG. 12 is a view of a "Settings" screen displayed on the user interface.
Figure 13:
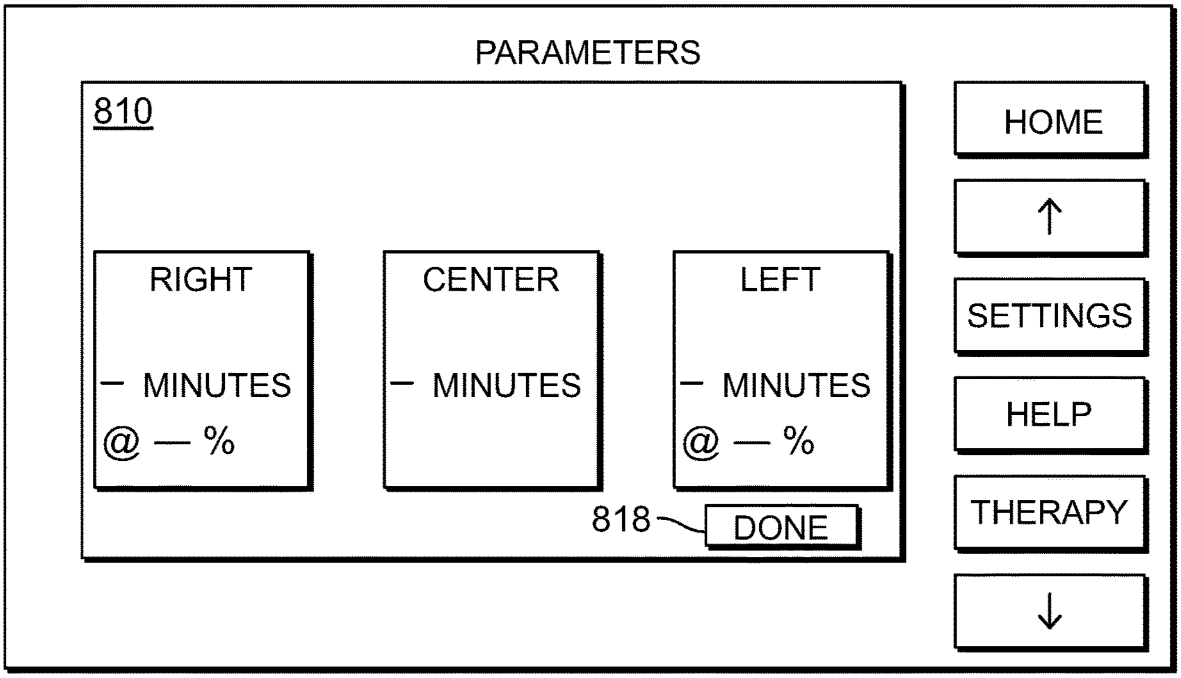
FIG. 13 is a view of a "Parameters" screen displayed on the user interface.

Referring to FIG. 6, a "Rotation" routine 90 is started, at process step 100, when the "Rotation Set-up" screen 610 is selected by the caregiver. When the "Rotation Set-up" screen 610 is selected, three buttons are generated and appear on the user interface 40, at process step 112. The three buttons include a "Settings" 612 button, a "Therapy" button 614, and an "Options" button 616, as illustrated in FIG. 11. The caregiver may select one of those buttons by providing an input into the controller 60, and the controller 60, at decision step 114, determines which button has been selected. Selection of the "Setting" button 612, allows for the user to adjust parameters for the rotation therapy as set forth above, and results in the generation of parameters buttons for the entry of program parameters, in process step 116. The parameter buttons include a "Full" parameter 712, a "Moderate" parameter 714, a "Minimum" parameter 716, and a "Custom" parameter 718, which are shown in the "Settings" screen 710, illustrated in FIG. 12. The controller 60, at decision step 118, determines which parameter 712, 714, 716, 718 has been selected. The "Full" parameter 712 enables the user to select a predetermined full rotation, i.e. 40 degrees on left and right. It should be noted that full rotation may include other angles of rotation, for example, an angle of rotation within a range of 35 degrees to 40 degrees. The "Moderate" parameter 714 enables the user to select an angle of rotation that is less than the full angle of rotation, i.e. 20 degrees. It should be noted that moderate rotation may include other angles of rotation, for example, an angle of rotation within a range of 25 degrees to 35 degrees. The "Minimum" parameter 716 enables the user to select an angle of rotation that is less than the moderate angle of rotation, i.e. 10 degrees. It should be noted that minimum rotation may include other angles of rotation, for example, an angle of rotation within a range of 20 degrees to 25 degrees. If the "Custom" parameter 718 is selected, the controller 60 generates buttons to enter custom parameters on a "Parameters" screen 810, in process step 120. The custom parameters may include an angle of rotation or a rotation time period. The "Parameters" screen 810, illustrated in FIG. 13, enables one of right rotation, center rotation, and left rotation to be entered in process step 122. When the entry of the parameters is completed, selection of a "Done" button 818, returns the user to the "Rotation Set-up" screen 610, shown in FIG. 11.

Figure 14:
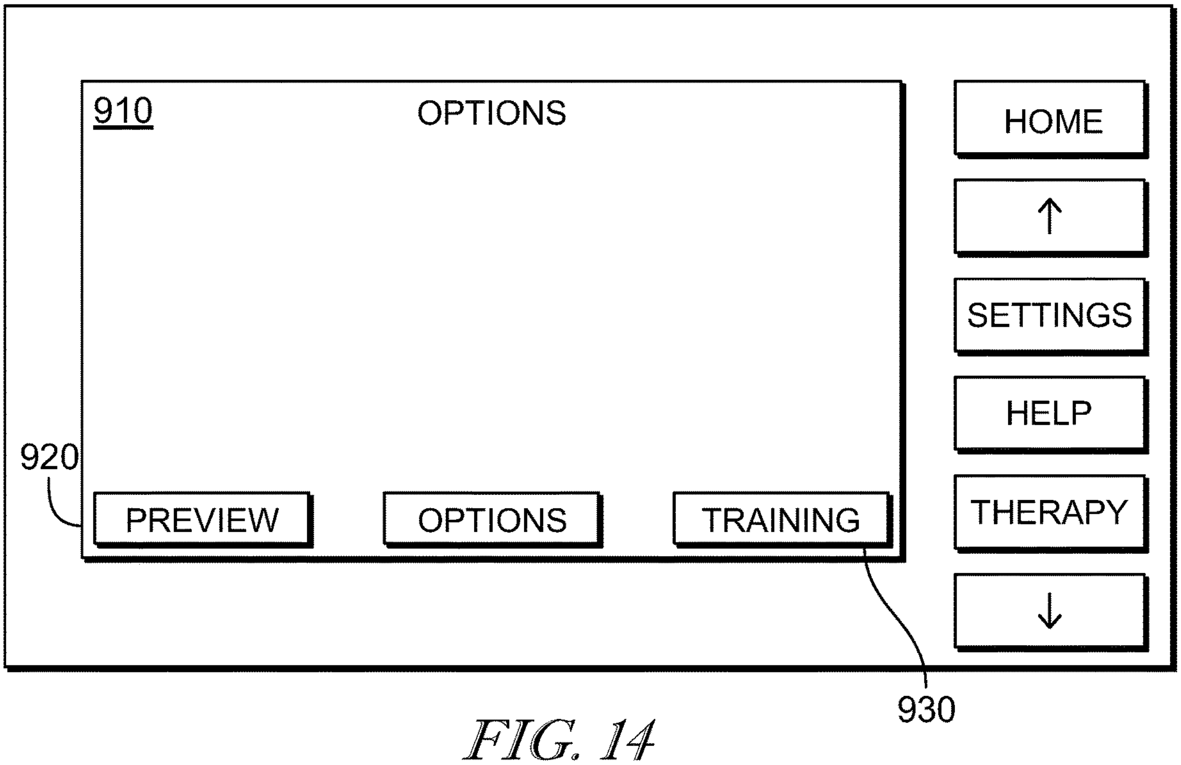
FIG. 14 is a view of an "Options" screen displayed on the user interface.

If the caregiver selects the "Options" button 616 on the "Rotation Set-up" screen 610, at decision step 114, the controller 60 generates an "Options" screen 910, as illustrated in FIG. 14, that displays a "Training" button 930 and a "Preview" button 920, at process step 124. The controller 60, at decision step 126, determines which button has been selected. Selection of the "Preview" button 920 results the generation, at process step 128, of a "Preview" subroutine 750, as illustrated in FIG. 7. Selection of the "Training" button 930 results in the generation the "Training" subroutine, at process step 130. After the "Training" subroutine, the "Rotation" routine 90 ends, at process step 132.

In some embodiments, selecting the "Training" button 930 causes the control system to cause the intermittent movement of the rotation device to the desired angle of rotation over a plurality of periods of time. In some embodiments, the rotation device is moved to 50% of the desire angle of rotation over a first of the plurality of periods of time. The rotation device may then be moved to an additional 10% of the desired angle of rotation over a second of the plurality of periods of time. The second of the plurality of periods of time may occur one hour after the first of the plurality of periods of time.

The "Preview" subroutine 750 allows caregivers to see the rotation settings without waiting for the dwell or hold time, as set forth above. Activating the "Preview" button 920 rotates the patient support surface without dwell or hold time while the patient is on the patient support surface allowing the caregiver to evaluate the settings. The patient support apparatus may be rotated to at least three evaluation positions. These positions include left rotation relative to the longitudinal axis of the patient support apparatus, flat position, and right rotation relative to the longitudinal axis of the patient support apparatus.

Figure 15:
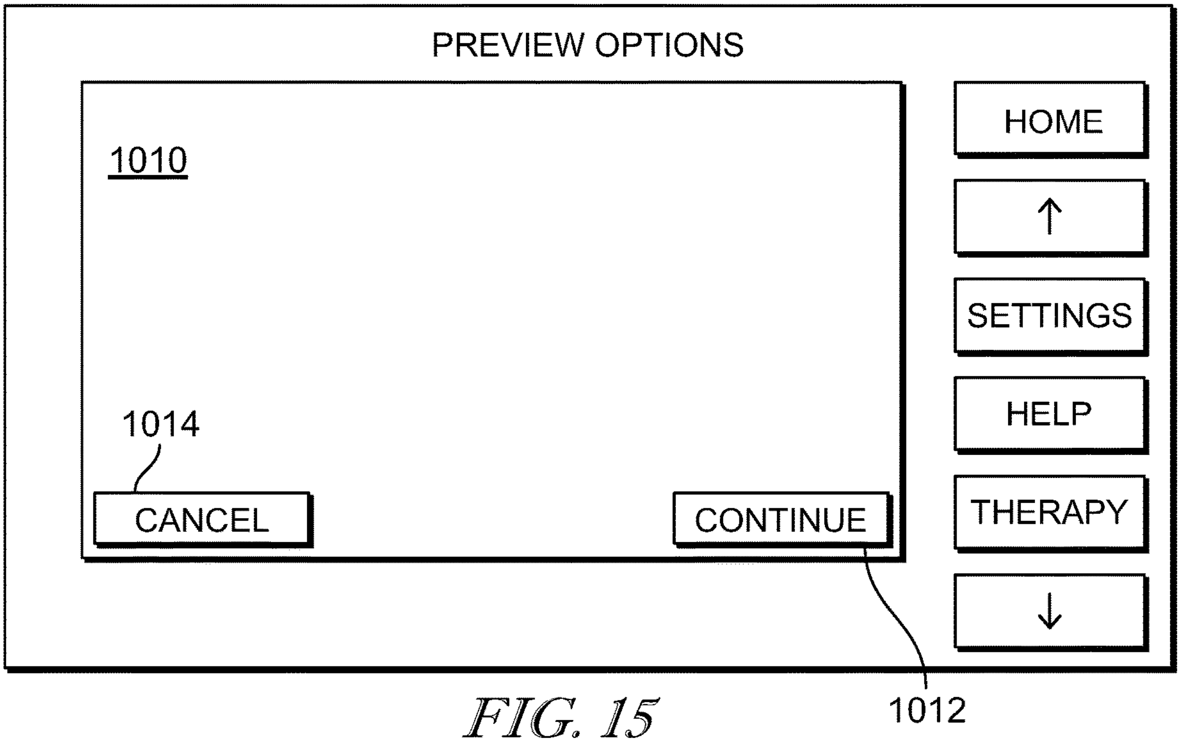
FIG. 15 is a view of a "Preview Options" screen displayed on the user interface.
Figure 16:
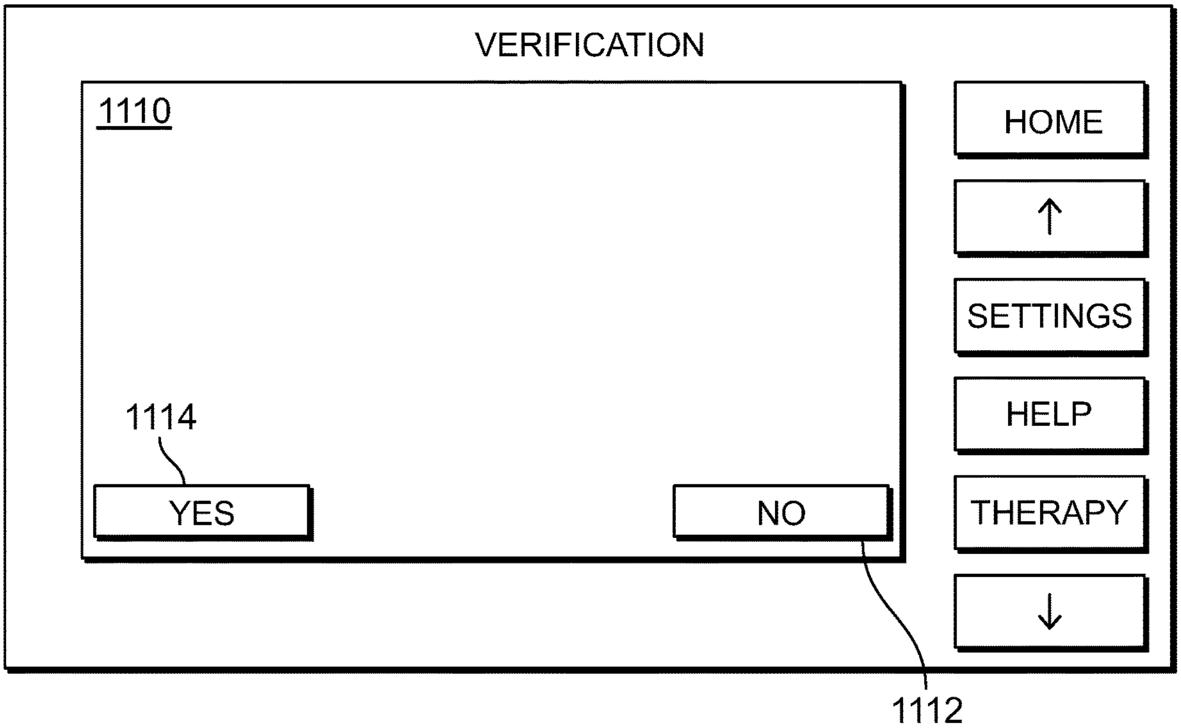
FIG. 16 is a view of a "Verification" screen displayed on the user interface.

The "Preview" subroutine 750 is illustrated in FIG. 7. The controller 60, starts the "Preview" subroutine 750, at process step 128, in response to the "Preview button" 920 being selected by the caregiver, at decision step 126 of FIG. 6. A "Preview Option" screen 1010, illustrated in FIG. 15, provides information about the preview process to the user, at process step 210. A "Continue" button 1012 and a "Cancel" button 1014, are generated on the "Preview Option" screen 1010 of the user interface 40, at process step 210. The controller 60, at decision step 212, determines whether the "Continue" button 1012 has been selected. Selection of the "Continue" button 1012, at decision step 212, results in the generation, at decision step 216, of buttons on a "Verification" screen 1110 to verify the entry of initial parameters, as illustrated in FIG. 16. A caregiver's response to the buttons on the "Verification" screen 1110 ensures that the rotation parameters have been entered prior to the start of the preview process. At decision step 218, the controller 60, determines if the initial parameters have been entered. The caregiver may select either a "Yes" button 1114 or a "No" button 1112. At process step 219, selection of the "No" button 1112 results in a return of the "Rotation Set-up" screen 610 at process step 110 of the "Rotation" routine 90 illustrated FIG. 6. The caregiver is then prompted to select one of the three buttons in step 112.

Figure 17:
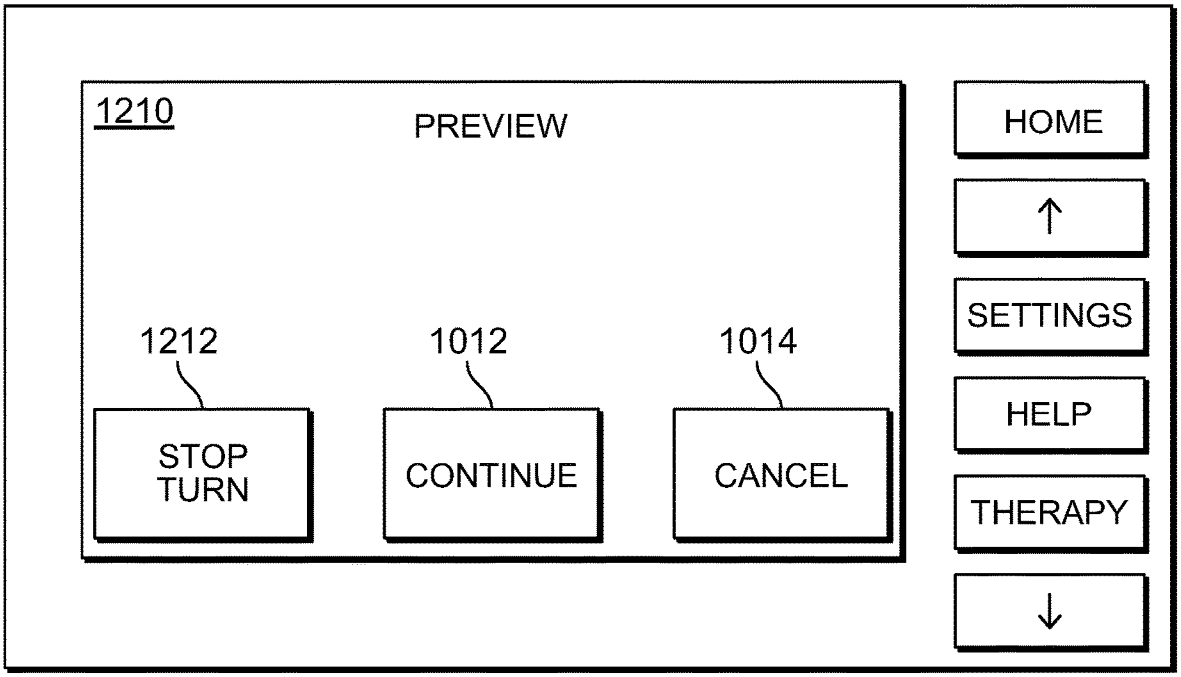
FIG. 17 is a view of a "Preview" screen displayed on the user interface.

Selection of the "Yes" button 1114, causes the controller 60 to rotate the left side of the mattress 14 of the patient support apparatus 10 through actuation of the bladder system 47, at process step 220. A "Preview" screen 1210 of the user interface 40 is illustrated in FIG. 17. The "Preview" screen 1210 includes a "Stop Turn" button 1212, a "Continue" button 1012, and a "Cancel" button 1014. An "Evaluation" subroutine 752, illustrated in FIG. 8, is implemented at process step 222. The mattress 14 of the patient support apparatus 10 is rotated to the left side during a left turn evaluation period for the left turn predetermined time. During the left turn predetermined time, the caregiver has an opportunity to examine all the external cords associated with the apparatus and ensure that all cords and attachments are in functional order. Furthermore, in some instances the weight of the patient may prevent from the air bladders from inflating according to the rotation angle specified by the parameter settings. In those cases, the caregiver may evaluate the rotation of the mattress and alter the parameter setting during this preview phase.

Figure 18:
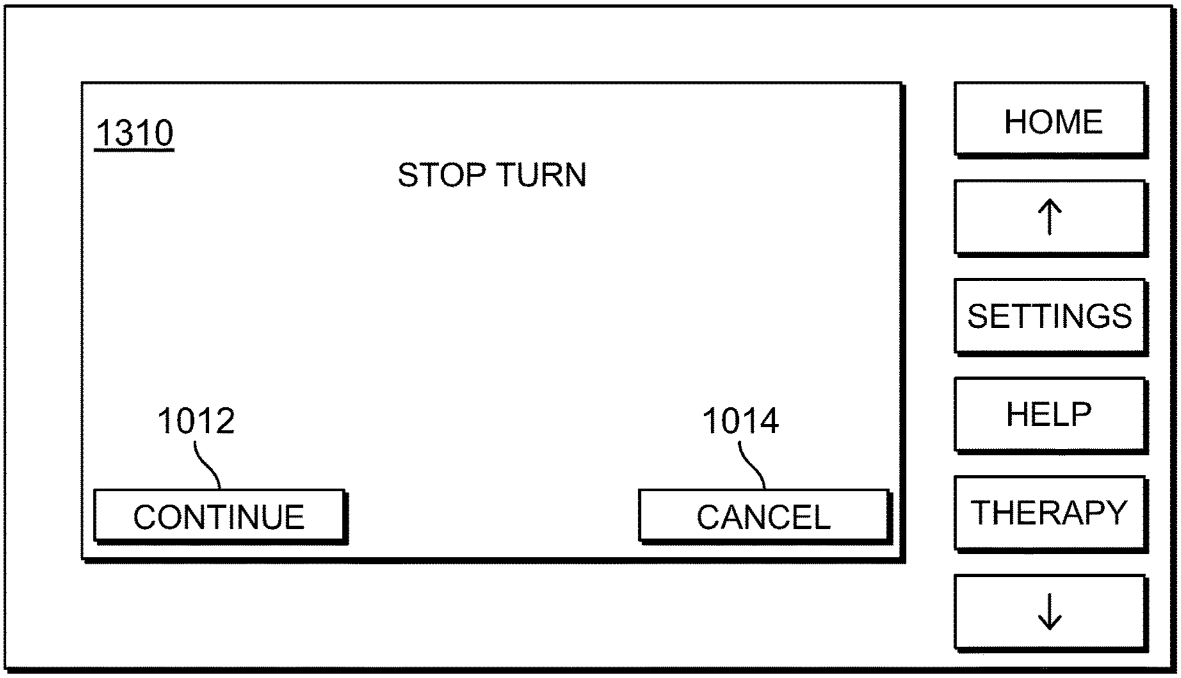
FIG. 18 is a view of a "Stop Turn" screen displayed on the user interface.

During the "Evaluation" subroutine 752, the "Continue" button 1012 and the "Stop Turn" button 1212, are monitored by the controller 60, at process step 310. Selection of the "Continue" button 1012, at decision step 312, causes the "Evaluation" subroutine 752 to complete the evaluation, at process step 314. Selection of the "Stop Turn" button 1212, at decision step 312, causes the rotation of the surface of the patient support apparatus 10 to stop, at process step 316. A "Stop Turn" screen 1310, as illustrated in FIG. 18, generates a "Cancel" button 1014 and a "Continue" button 1012 on the user interfaces 40, at process step 318. Selection of the "Cancel" button 1014, at decision step 320, results in the controller 60 causing the patient to rotate back to the center through actuation of the bladder system 47, at process step 322. This ensures that the patient moved back to a position where the patient's back is parallel to the ground. The controller 60, at process step 324, ends the "Evaluation" subroutine 752 and exits from the "Preview" subroutine 750.

If the "Cancel" button 1014 is not selected by the caregiver at decision step 320, the controller 60 determines if the "Continue" button has been selected, at decision step 326. Selection of the "Continue" button 1012, at decision step 326, results in the continuation of the "Preview" subroutine 750 at the current evaluation step, at process step 328. At decision step 330, if the controller 60 determines that a threshold time, i.e. the left turn predetermined time, has not been exceeded, the "Preview" subroutine 750 is continued from the current point of evaluation. The caregiver may select the "Cancel" button 1014 at any time. If the "Cancel" button 1014 is selected, at decision step 332, the controller 60 rotates the patient back to the center through actuation of the bladder system 47, at process step 334. The controller 60 exits the "Preview" subroutine 750 at the current point of the "Evaluation" subroutine 752, at process step 336. If the "Cancel" button 1014 is not selected at decision step 332 and the threshold time has not been exceeded, the "Preview" subroutine 750 is continued at the current point of the "Evaluation" subroutine 752 that is being executed.

If the controller 60 determines that no input has not been selected at decision step 312, the controller 60 determines whether the threshold time has been exceeded, at decision step 338. It the threshold time is not exceeded, at process step 340, the controller 60 awaits an input from the caregiver. The threshold time is continuously monitored, and once that time is exceeded, the patient is rotated back to the center by through actuation of the bladder system 47, at process step 342.

Figure 19:
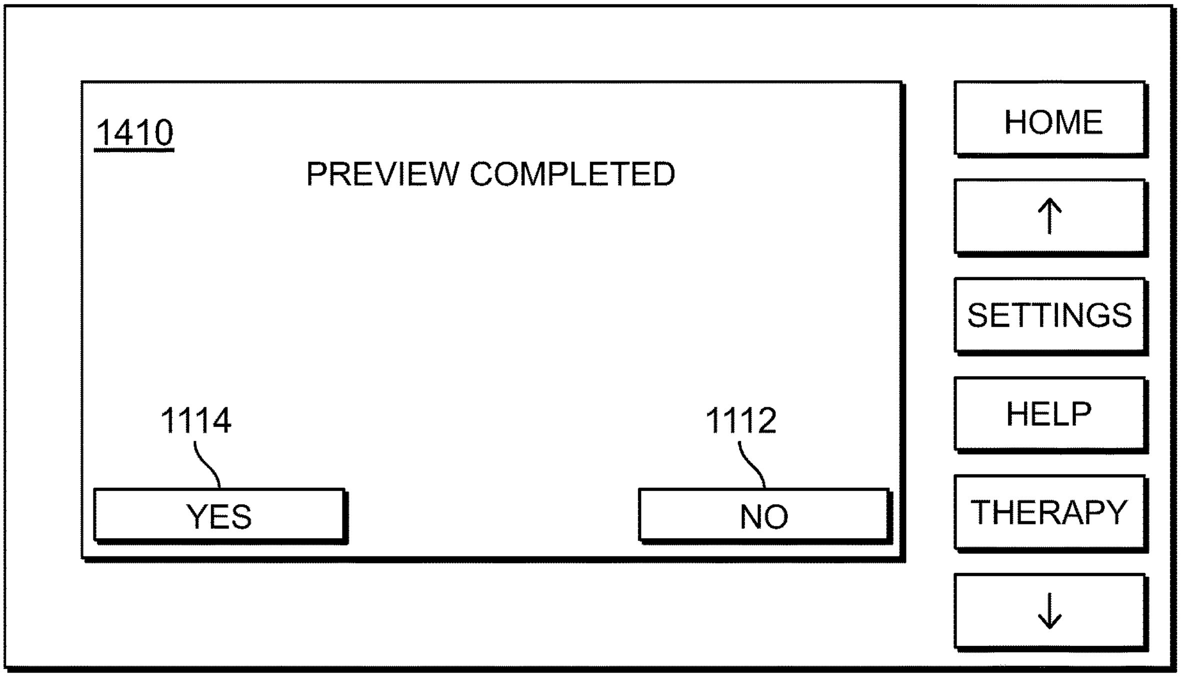
FIG. 19 is a view of a "Preview Complete" screen displayed on the user interface.

Following the rotation of the patient on the surface of the patient support apparatus 10 to the center, the "Evaluation" subroutine 752 is again implemented, at process step 226 of "Preview" subroutine 750. After the implementation of the "Evaluation" subroutine 752, the controller 60 determines if the "Evaluation" subroutine 752 is completed, and the patient is rotated to the right side for a right turn predetermined time through actuation of the bladder system 47, at process step 228. Following the rotation of the surface of the patient support apparatus 10 to the right side, the "Evaluation" subroutine 752 is again implemented, at process step 230. The controller 60, at decision step 232, determines if the "Evaluation" subroutine 752 of the right side is completed, and then and rotates the patient back to the center through actuation of the bladder system 47. Notably, between evaluating the right turn and the left, the patient may be placed in the flat position for the flat predetermined period of time, so that the patient and patient lines may be assessed when moving from the right turn to the left turn. At process step 234, the controller 60 generates a "Preview" Complete screen 1410, as illustrated in FIG. 19.

The controller 60, at decision step 236, determines if the "Yes" button 1114 or "No" button 1112 is selected. Selection of the "Yes" button 1114 causes the reappearance of the "Rotation Set-up" screen 610 on the user interface 40, at process step 238. Selection of the "No" button 1112 results in the continuation of the preview process, at process step 240. At process step 242, the duration of the time that the preview process is ongoing is continuously determined. If the time exceeds a certain threshold time determined previously by the caregiver, the controller 60 causes the patient to rotate back to the center through actuation of the bladder system, at process step 244. This ensures that the patient is moved back to a position such that the patient's back is parallel to the ground, and that the patient is not left rotated to the left or right for an extended period of time. The "Preview" subroutine 750 is then exited, at process step 246. At decision step 242, if the controller 60 determines that the threshold time has not been exceeded, the preview subroutine is continued until the controller 60 determines that the threshold time has been exceeded.

At decision step 212, if the "Continue" button 1012 is not selected, the controller 60 determines if the "Cancel" button 1014 has been selected, at decision step 214. Selection of the "Cancel" button 1014 causes the patient to rotate back to the center through actuation of the bladder system 47, at process step 252, if the patient is currently rotated to either side. The "Preview" subroutine 750 is exited, at process step 248. However, if neither the "Continue" button 1012 is selected at decision step 212, nor the "Cancel" button 1014 is selected at decision step 214, the controller 60 determines the duration of the time the preview process has been ongoing, at process step 250.

If the time exceeds a certain threshold time determined previously by the caregiver, the controller 60 causes the patient to rotate back to the center by rotating the surface of the patient support apparatus 10 to center if the patient is currently rotated to either side, at step process 252. This ensures that the patient moved back to a position such that the patient's back is parallel to the ground, and that the patient is not left rotated to the left or right for an extended period of time. The "Preview" subroutine 750 is then exited, at process step 248. At decision step 250, if the controller 60 determines that the threshold time has not been exceeded, the "Preview" subroutine 750 is continued, and the controller 60 awaits an input from the caregiver, at decision step 254. The threshold time is continuously monitored, and once that time is exceeded, the controller 60 proceeds to process step 252 and rotates the patient back to the center through actuation of the bladder system 47.

The determination of the threshold time is important so that the patient is not left in either the left rotated position or right rotated position for a length of time that is detrimental to patient health. In the instances when the care giver is forced to leave the patient side before completing the preview process, the monitoring of this threshold time ensures that the patient is returned to a flat position within a certain time period.

After evaluation, the caregiver may select, at decision step 114 of the "Rotation" routine 90, the "Therapy" button 614 of the "Rotation Set-up" screen 610, illustrated in FIG. 11. Accordingly, therapy is started by the controller, at process step 140, illustrated in FIG. 6. After the completion of therapy, the "Rotation" routine 90 is ended, at process step 142.

Figure 20:
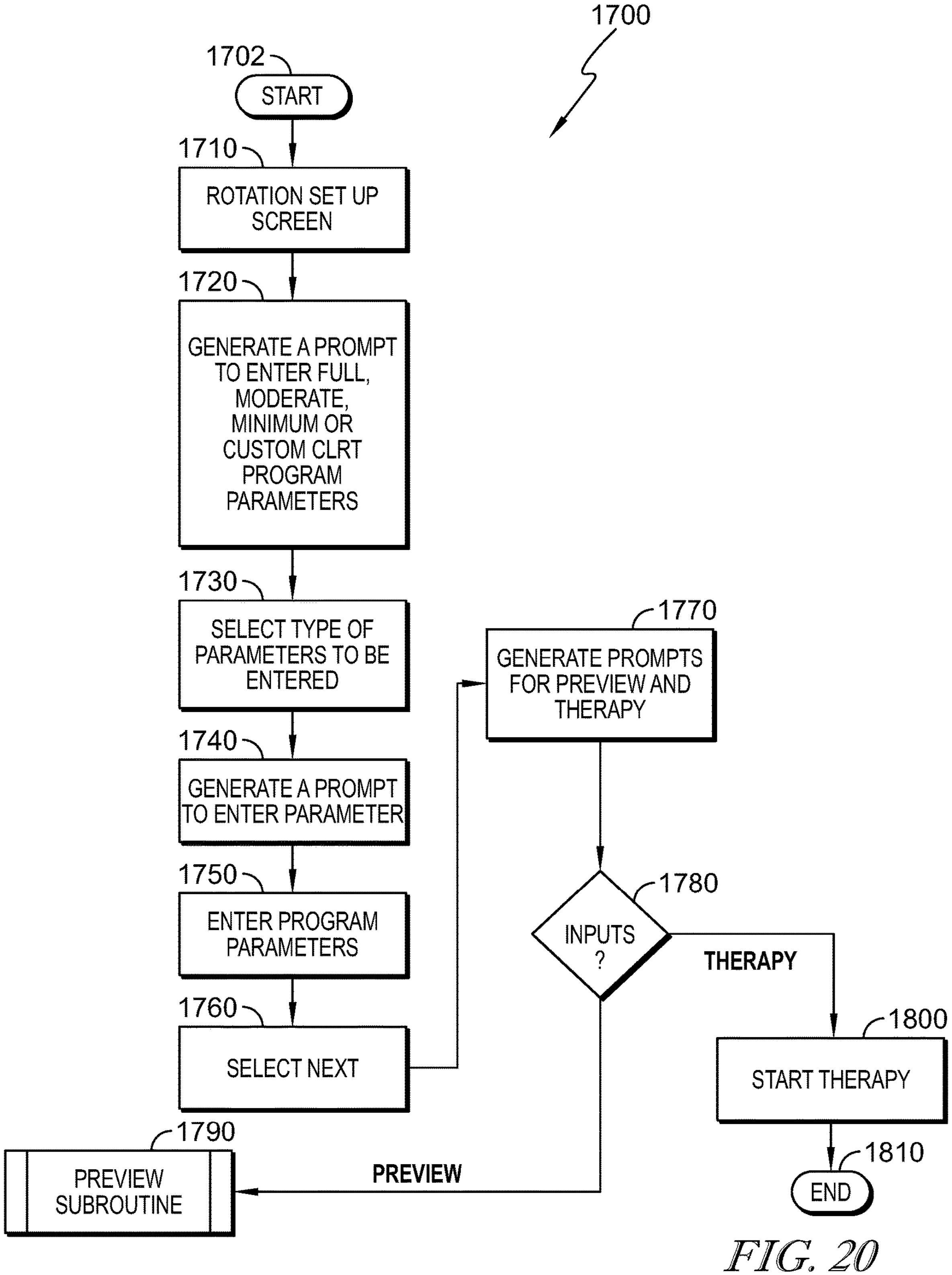
FIG. 20 is a flow chart illustrating an algorithm that executes a preview process in accordance with another embodiment.
Figure 22:
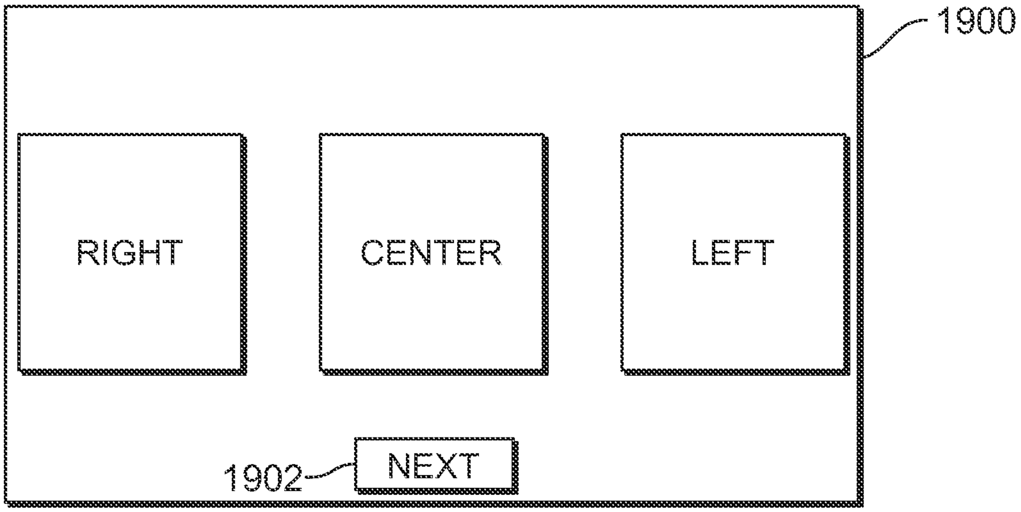
FIG. 22 is a view of a "Parameters screen" displayed on the user interface.
Figure 23:
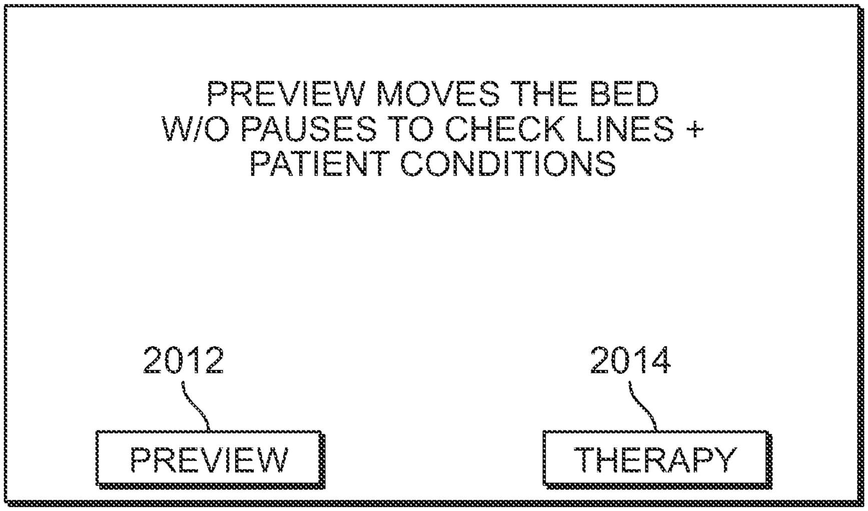
FIG. 23 is a view of a "Preview Options" screen displayed on the user interface.

Referring now to FIG. 20, an alternative "Rotation" routine 1700 is started at process step 1702. The controller 60, at decision step 1710, determines if the "Rotation Set-up" screen 610 is selected by the caregiver. Selection of the "Rotation" button 520 results in generation of four buttons for the entry of program parameters, in decision step 1720. The parameter buttons include a "Full" parameter 712, a "Moderate" parameter 714, a "Minimum" parameter 716, and a "Custom" parameter 718. In the instance that "Custom" parameter 718 is selected at decision step 1730, buttons are generated to enter the custom parameters, at decision step 1740. The "Parameters" screen 1900, illustrated in FIG. 22, includes parameters of right rotation, center rotation and left rotation that are entered at decision step 1750. When the entry of the parameters is completed, selection of the "Next" button, 1902 in decision step 1760, results in the generation of two buttons, a "Preview" button 2012 and a "Therapy" button 2014, at process step 1770, similar to those shown in FIG. 23. In some embodiment, the "Parameters" screen 1900, includes a "Preview" button 1912 (not illustrated) and a "Therapy" button 1914 (not illustrated) instead of the "Next" button 1902, and process step 1770 immediately follows decision step 1750.

Selection of the "Start Therapy" button 2216, at decision step 1780, results in that input being received by the controller 40 and the therapy being initiated, at process step 1800. Once therapy is completed, the process is ended, at process step 1810.

Figure 21:
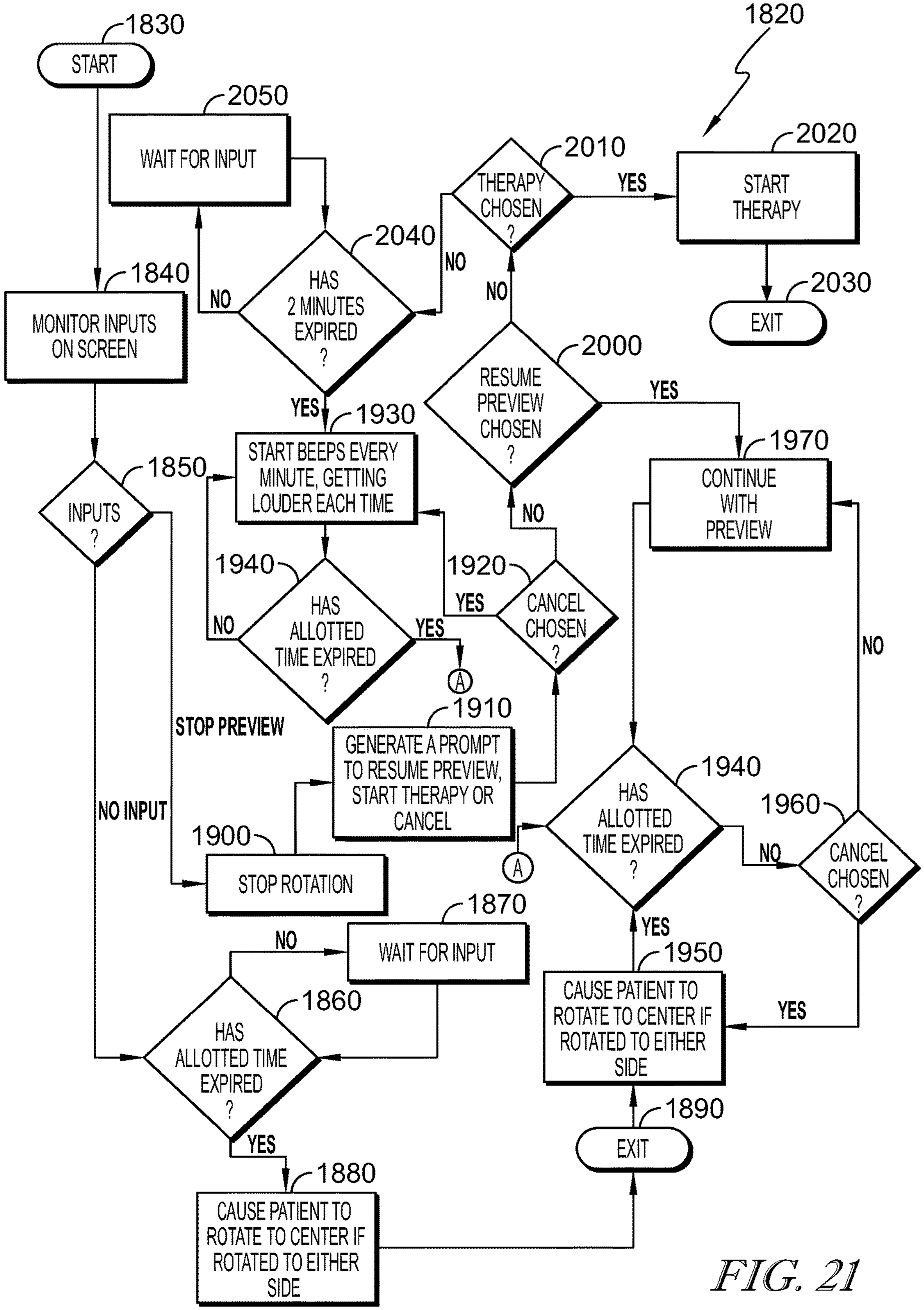
FIG. 21 is a flow chart illustrating an algorithm that executes a preview process in accordance with another embodiment.
Figure 24:
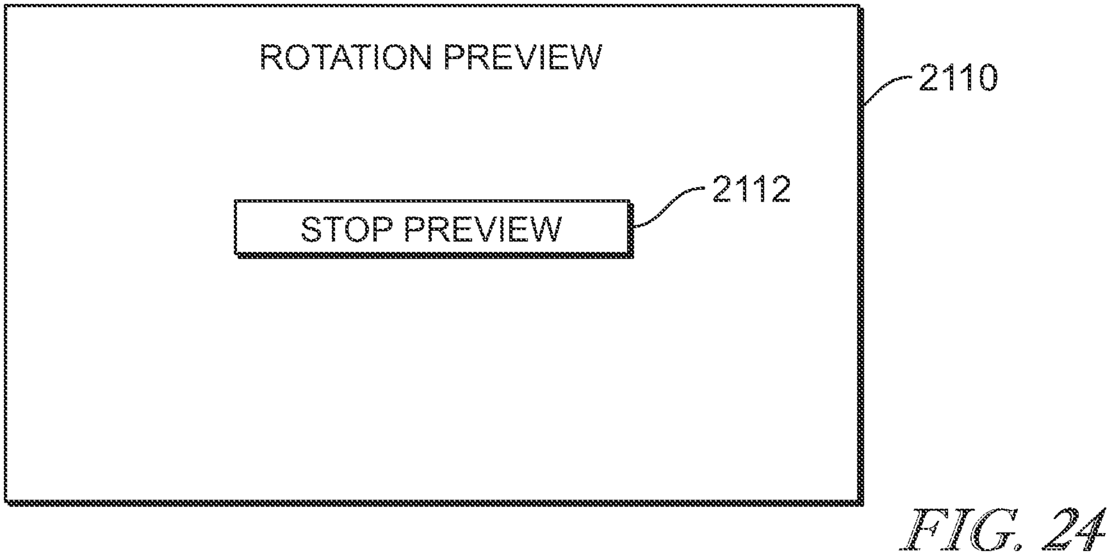
FIG. 24 is a view of a "Rotation Preview" screen displayed on the user interface.

If the caregiver selects the "Preview" button 2012 at decision step 1780, the controller 60 starts the "Preview" subroutine 1820 illustrated in FIG. 21, at step 1830, and generates the "Rotation Preview" screen 2110 displaying a "Stop Preview" button 2112, as illustrated in FIG. 24. At process step 1840, the controller 60 monitors the user inputs to determine whether the "Stop Preview" button 2112 has been selected. If no input is entered, at decision step 1850, the controller 60 continues to decision step 1860 to determine whether a predetermined period of time has expired. If the predetermined period of time has not expired, the controller 60 continues to wait for an input, at process step 1870. If the predetermined period of time has expired, the controller 60 moves the patient back to the flat position, at process step 1880, and the preview is ended, at process step 1890.

Figure 25:
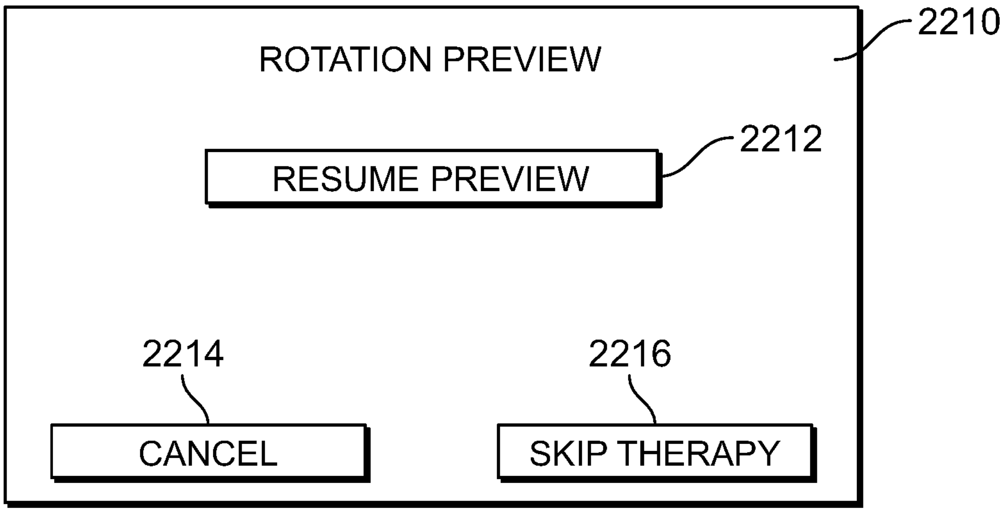
FIG. 25 is a view of a "Resume Preview" screen displayed on the user interface.

If the "Stop Preview" button 2112 is selected, at decision step 1850, the controller 60 stops rotation of the mattress 14, at process step 1900. At process step 1910, the controller 60 generates the "Rotation Preview" screen 2210, illustrated in FIG. 25. The "Rotation Preview" screen 2210 includes a "Resume Preview" button 2212, a "Cancel" button 2214, and a "Start Therapy" button 2216. At decision step 1920, the controller 60 determines whether the "Cancel" button 2214 has been selected. If the "Cancel" button 2214 has been selected, the controller 60 generates an alarm, for example, a beep every minute, with the beeps getting louder each minute, at process step 1930. The controller 60 then determines whether the predetermined period of time has expired, at process step 1940. If the predetermined period of time has not expired, the beeps continue, at process step 1930. During this time, the controller 60 determines whether the "Cancel" button 2214 has been selected, at decision step 1960. If the "Cancel" button 2214 is selected, the controller 60, at process step 1950, moves the mattress back to center, and the process ends, at process step 1890. If the "Cancel" button 2214 is not selected, the controller 60 continues the preview, at process step 1970. If the predetermined period of time has expired, the controller 60, at process step 1950, moves the mattress back to center, and the process ends, at process step 1890.

At the decision step 1920, if the "Cancel" button 2214 is not chosen, the controller 60 determines, at decision step 2000, whether the "Resume Preview" button 2212 has been selected. If the "Resume Preview" button 2212 is selected, the preview continues, at process step 1970. If the "Resume Preview" button 2212 is not selected, the controller 60 determines whether the "Start Therapy" button 2216 has been selected, at decision step 2010. If the "Start Therapy" button 2216 has been selected, the therapy starts, at process step 2020. At the conclusion of therapy, the process ends, at process step 2030. If the "Start Therapy" button 2216 is not selected, the controller 60 determines whether two minutes has expired, at decision step 2040. If two minutes has not expired, the controller 60 continues to wait for an input, at process step 2050. If two minutes has expired, the controller 60 generates an alarm, for example, a beep every minute, with the beeps getting louder each minute, at process step 1930.

Although certain illustrative embodiments have been described in detail above, variations and modifications exist within the scope and spirit of this disclosure as described and as defined in the following claims.

The invention claimed is:

1. A patient support apparatus, comprising:

a patient support surface including a rotation device, and a controller operable to control the rotation device, the controller including a processor and a non-transitory memory device, the memory device including instructions that, when executed by the processor, cause the processor to operate the rotation device to perform a rotation preview sequence prior to the processor being operated to initiate a rotation sequence in which the patient support surface is moved to a desired angle of rotation by the rotation device and held in the desired angle of rotation for a dwell time, wherein, during the rotation preview sequence, the controller causes the rotation device to move the patient support surface to a first evaluation position for a first predetermined period of time that is less than the dwell time, wherein the first predetermined period of time enables the caregiver to assess a patient on the patient support surface at the first evaluation position, wherein, during the rotation preview sequence, the rotation device moves the patient support surface to a flat position after the first predetermined period of time, and wherein, after the rotation preview sequence, the caregiver is enabled to activate the rotation sequence to move the patient support surface to the desired angle of rotation and held at the desired angle of rotation for the dwell time that is greater than the first predetermined period of time of the rotation preview sequence.

2. The patient support apparatus of claim 1, wherein, during the first predetermined period of time, the caregiver is enabled to cancel the rotation preview sequence so that the controller returns the patient support surface to the flat position before an expiration of the first predetermined period of time.

3. The patient support apparatus of claim 1, wherein:

the rotation device includes a left rotation bladder and a right rotation bladder, and the first evaluation position includes at least one of a left rotation position, wherein the left rotation bladder is inflated to a capacity greater than the right rotation bladder, and a right rotation position, wherein the right rotation bladder is inflated to a capacity greater than the left rotation bladder.

4. The patient support apparatus of claim 3, wherein, in the flat position, the right rotation bladder and the left rotation bladder are inflated to substantially the same capacity.

5. The patient support apparatus of claim 1, wherein the first evaluation position has an angle of rotation relative to a longitudinal axis of the patient support surface that is within a range of 1 degree to 40 degrees.

6. The patient support apparatus of claim 1, wherein the first predetermined period of time is within a range of 0 seconds to 30 seconds.

7. The patient support apparatus of claim 1, wherein, during the rotation preview sequence, the rotation device moves the patient support surface to a second evaluation position for a second predetermined period of time, wherein the second predetermined period of time begins at the expiration of the first predetermined period of time.

8. The patient support apparatus of claim 7, wherein the second predetermined period of time enables the caregiver to assess the patient on the patient support surface at the second evaluation position.

9. The patient support apparatus of claim 7, wherein the second evaluation position has angle of rotation that is substantially zero.

10. The patient support apparatus of claim 7, wherein the second predetermined period of time is within a range of 0 seconds and 30 seconds.

11. The patient support apparatus of claim 7, wherein, during the rotation preview sequence, the rotation device moves the patient support surface to a third evaluation position for a third predetermined period of time, wherein the third predetermined period of time begins at an expiration of the second predetermined period of time.

12. The patient support apparatus of claim 11, wherein the third predetermined period of time enables the caregiver to assess a position of a patient on the patient support surface at the third evaluation position.

13. The patient support apparatus of claim 12, wherein the rotation device moves the patient support surface to the flat position after the third predetermined period of time.

14. The patient support apparatus of claim 11, wherein, during the third predetermined period of time, the caregiver is enabled to cancel the rotation preview sequence so that the controller returns the patient support surface to the flat position before an expiration of the third predetermined period of time.

15. The patient support apparatus of claim 11, wherein the third evaluation position has an angle of rotation relative to a longitudinal axis of the patient support surface that is within a range of 1 degree to 40 degrees.

16. The patient support apparatus of claim 11, wherein the third predetermined period of time is within a range of 0 seconds and 30 seconds.

17. The patient support apparatus of claim 1, wherein a display includes buttons for the caregiver to enter initial rotation parameters prior to the start of the rotation preview sequence.

18. The patient support apparatus of claim 17, wherein the initial rotation parameters include the desired angle of rotation.

19. The patient support apparatus of claim 1, wherein during a training preview the control system causes intermittent movement of the rotation device to the desired angle of rotation over a plurality of periods of time.

* * * * *